United States Patent
Muruganathan et al.

(10) Patent No.: US 12,250,040 B2
(45) Date of Patent: Mar. 11, 2025

(54) SYSTEMS AND METHODS FOR EARLY CSI FEEDBACK IN NR

(71) Applicant: Telefonaktiebolaget LM Ericsson (publ), Stockholm (SE)

(72) Inventors: Siva Muruganathan, Stittsville (CA); Sebastian Faxér, Stockholm (SE); Mattias Frenne, Uppsala (SE); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 17/763,789

(22) PCT Filed: Sep. 25, 2020

(86) PCT No.: PCT/IB2020/059012
§ 371 (c)(1),
(2) Date: Mar. 25, 2022

(87) PCT Pub. No.: WO2021/059239
PCT Pub. Date: Apr. 1, 2021

(65) Prior Publication Data
US 2022/0407576 A1 Dec. 22, 2022

Related U.S. Application Data

(60) Provisional application No. 62/907,176, filed on Sep. 27, 2019.

(51) Int. Cl.
*H04B 7/06* (2006.01)
*H04B 17/336* (2015.01)
(Continued)

(52) U.S. Cl.
CPC ......... *H04B 7/0626* (2013.01); *H04B 7/0632* (2013.01); *H04B 7/0639* (2013.01);
(Continued)

(58) Field of Classification Search
None
See application file for complete search history.

(56) References Cited

U.S. PATENT DOCUMENTS

2016/0212733 A1* 7/2016 Davydov .............. H04L 5/0035
2017/0353976 A1 12/2017 Yerramalli et al.
(Continued)

FOREIGN PATENT DOCUMENTS

| CN | 102065530 A | 5/2011 |
| CN | 102812658 A | 12/2012 |

(Continued)

OTHER PUBLICATIONS

Extended European Search Report for European Patent Application No. 20870304.1, mailed Jan. 3, 2023, 7 pages.
(Continued)

*Primary Examiner* — Diane L Lo
(74) *Attorney, Agent, or Firm* — Withrow & Terranova, PLLC

(57) ABSTRACT

Systems and methods for early Channel State Information (CSI) feedback in New Radio (NR) are provided. In embodiments of the disclosure, CSI reporting is performed during a random access procedure to provide early CSI feedback and enable more efficient data transmission with higher spectral efficiency in earlier communications. In some examples, CSI reporting can be reported on Message 3 of the random access procedure after measuring channel and/or interference on a CSI Reference Signal (RS) (CSI-RS) during the random access procedure. The proposed solution allows early CSI to be triggered when a User Equipment (UE) performs initial access to a serving cell. With the early CSI acquired, the network can perform proper link adaptation including Multiple Input Multiple Output (MIMO) precoding, and ensure efficient data transmission without
(Continued)

having to wait until connection setup and configuration of the CSI framework is established.

31 Claims, 13 Drawing Sheets

(51) Int. Cl.
  *H04L 5/00* (2006.01)
  *H04W 74/0833* (2024.01)
(52) U.S. Cl.
  CPC ......... *H04B 17/336* (2015.01); *H04L 5/0051* (2013.01); *H04W 74/0833* (2013.01)

(56) References Cited

U.S. PATENT DOCUMENTS

| | | | |
|---|---|---|---|
| 2018/0110074 A1 | 4/2018 | Akkarakaran et al. | |
| 2019/0273544 A1* | 9/2019 | Cha | H04L 5/0091 |
| 2020/0112355 A1* | 4/2020 | Park | H04L 5/0094 |
| 2020/0383119 A1 | 12/2020 | Sun et al. | |
| 2020/0396633 A1 | 12/2020 | Tseng et al. | |
| 2021/0195458 A1 | 6/2021 | Priyanto et al. | |

FOREIGN PATENT DOCUMENTS

| | | |
|---|---|---|
| CN | 106131946 A | 11/2016 |
| CN | 107182115 A | 9/2017 |
| CN | 110113818 A | 8/2019 |
| EP | 2869478 A1 | 5/2015 |
| EP | 2919506 A1 | 9/2015 |
| WO | 2021057418 A1 | 4/2021 |
| WO | 2021057928 A1 | 4/2021 |

OTHER PUBLICATIONS

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.
Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.
Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.
Author Unknown, "Technical Specification Group Radio Access Network; NR; Physical layer procedures for control (Release 16), " Technical Specification 38.213, Version 16.1.0, Mar. 2020, 3GPP Organizational Partners, 156 pages.
Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
International Search Report and Written Opinion for International Patent Application No. PCT/CN2020/117908, mailed Jan. 4, 2021, 11 pages.
Ericsson, "R1-1907179: Use Cases and Scenarios for 2-Step Rach," 3GPP TSG-RAN WG1 Meeting #97, May 13-17, 2019, Reno, Nevada, 4 pages.
Nokia, et al., "R2-1906588: Early measurement reporting details, " 3GPP TSG-RAN WG2 Meeting #106, May 13-17, 2019, Reno, Nevada, 3 pages.
Oppo, "R1-1906581: On Procedure for 2-step RACH," 3GPP TSG RAN WG1 #97, May 13-17, 2019, Reno, Nevada, 7 pages.
International Search Report and Written Opinion for International Patent Application No. PCT/CN2020/113069, mailed Dec. 1, 2020, 6 pages.
International Search Report and Written Opinion for International Patent Application No. PCT/IB2020/059012, mailed Dec. 18, 2020, 10 pages.
Ericsson, "R1-1907472: Early CSI reporting in Ho," 3GPP TSG-RAN WG1 Meeting #97, May 13-17, 2019, Reno, Nevada, 3 pages.
Office Action for Canadian Patent Application No. 3154747, mailed Mar. 30, 2023, 4 pages.
Office Action for Canadian Patent Application No. 3154747, mailed Jan. 3, 2024, 5 pages.
Extended European Search Report for European Patent Application No. 20867260.0, mailed Oct. 27, 2023, 9 pages.
Notice of Reasons for Refusal for Japanese Patent Application No. 2022-519422, mailed May 30, 2023, 7 pages.
Decision of Refusal for Japanese Patent Application No. 2022-519422, mailed Nov. 21, 2023, 5 pages.
Reconsideration Report for Japanese Patent Application No. 2022-519422, mailed Jul. 2, 2024, 4 pages.
Non-Final Office Action for U.S. Appl. No. 17/763,727, mailed Jun. 6, 2024, 18 pages.

* cited by examiner

SYSTEMS AND METHODS FOR EARLY CSI FEEDBACK IN NR

RELATED APPLICATIONS

This application is a 35 U.S.C. § 371 national phase filing of International Application No. PCT/IB2020/059012, filed Sep. 25, 2020, which claims the benefit of provisional patent application Ser. No. 62/907,176, filed Sep. 27, 2019, the disclosures of which are hereby incorporated herein by reference in their entireties.

TECHNICAL FIELD

The present disclosure relates to providing early channel information in telecommunications systems.

BACKGROUND

New Radio (NR)

The new generation mobile wireless communication system, Third Generation Partnership Project (3GPP) Fifth Generation (5G) or New Radio (NR), supports a diverse set of use cases and a diverse set of deployment scenarios. NR uses Cyclic Prefix (CP) Orthogonal Frequency Division Multiplexing (OFDM) (CP-OFDM) in the downlink (e.g., from a network node, New Radio Base Station (gNB), Evolved Node B (eNB), or other base station, to a User Equipment (UE) and both CP-OFDM and Discrete Fourier Transform (DFT)-spread OFDM (DFT-S-OFDM) in the uplink (e.g., from UE to gNB). In the time domain, NR downlink and uplink physical resources are organized into equally-sized subframes of 1 millisecond (ms) each. A subframe is further divided into multiple slots of equal duration.

The slot length depends on subcarrier spacing. For subcarrier spacing of $\Delta f=15$ kilohertz (kHz), there is only one slot per subframe and each slot always consists of 14 OFDM symbols, irrespective of the subcarrier spacing.

FIG. 1 is a schematic diagram of an exemplary NR time-domain structure having 15 kHz subcarrier spacing. Typical data scheduling in NR is performed on a per slot basis, where the first two symbols contain a Physical Downlink Control Channel (PDCCH) and the remaining 12 symbols contain a Physical Data Channel (PDCH), such as a Physical Downlink Shared Channel (PDSCH) or a Physical Uplink Shared Channel (PUSCH).

Different subcarrier spacing values are supported in NR. The supported subcarrier spacing values (also referred to as different numerologies) are given by $\Delta f=(15 \times 2^{\alpha})$ kHz where a is a non-negative integer. $\Delta f=15$ kHz is the basic subcarrier spacing that is also used in Long Term Evolution (LTE). The slot durations at different subcarrier spacings are shown in Table 1. In the table, the numerology is denoted as $\mu$. Numerology with subscript 0 corresponds to 15 kHz, numerology with subscript 1 corresponds to 30 kHz, etc. It should be noted that the numerology for uplink and downlink can be different in NR.

TABLE 1

Slot length at different numerologies.

| Numerology ($\mu$) | Slot length | RB BW |
|---|---|---|
| $\mu_0$ = 15 kHz | 1 ms | 180 kHz |
| $\mu_1$ = 30 kHz | 0.5 ms | 360 kHz |
| $\mu_2$ = 60 kHz | 0.25 ms | 720 kHz |
| $\mu_3$ = 120 kHz | 125 $\mu$s | 1.44 MHz |
| $\mu_4$ = 240 kHz | 62.5 $\mu$s | 2.88 MHz |

FIG. 2 is a schematic diagram of a NR physical time-frequency resource grid. In the frequency domain physical resource definition, a system bandwidth is divided into Resource Blocks (RBs), each RB corresponding to 12 contiguous subcarriers. The NR physical time-frequency resource grid is shown with one RB within a 14-symbol slot. One OFDM subcarrier during one OFDM symbol interval forms one Resource Element (RE).

Downlink transmissions can be dynamically scheduled. For example, in each slot the gNB (or other base station) can transmit Downlink Control Information (DCI) over the PDCCH about which UE data is to be transmitted to and which RBs and OFDM symbols in the current downlink slot the data is transmitted on. The PDCCH is typically transmitted in the first one or two OFDM symbols in each slot in NR. UE data is carried on the PDSCH. A UE first detects and decodes the PDCCH and, if the decoding is successfully, it then decodes the corresponding PDSCH based on the decoded control information in the PDCCH.

Uplink data transmissions can also be dynamically scheduled using the PDCCH. Similar to downlink, a UE first decodes uplink grants in the PDCCH and then transmits data over the PUSCH based on the decoded control information in the uplink grant, such as modulation order, coding rate, uplink resource allocation, etc.

Random Access Procedures in LTE and NR

The random access procedures in LTE and NR are similar. In the existing random access design, random access procedures serve multiple purposes, such as initial access when establishing a radio link, scheduling requests, etc. Among others, an important objective of the random access procedures is to achieve uplink synchronization, which is important for maintaining uplink orthogonality in LTE and NR. To preserve the orthogonality of uplink signals from different UEs in an Orthogonal Frequency Division Multiple Access (OFDMA)-based system, the time of arrival of each UE's signal needs to be within the CP of the OFDM signal at the base station.

FIG. 3 is a flow diagram of the contention-based random access procedure under LTE and NR. LTE and NR random access can be either contention-based or contention-free. The contention-based random access procedure consists of four steps, as illustrated in FIG. 3. The procedure begins with Message 1, in which the UE transmits a random access preamble. The procedure continues with Message 2, in which the network (e.g., the gNB or eNB) transmits a random access response that contains a Timing Advance (TA) command and the scheduling of uplink resource for the UE to use in the third step. Note that random access response is a PDCCH/PDSCH transmission wherein the PDCCH is transmitted in the common search space.

The contention-based random access procedure continues with Message 3, in which the UE transmits its identity to the network using the scheduled resources. The procedure continues with Message 4, in which the network transmits a contention-resolution message to resolve any contention due to multiple UEs transmitting the same random access preamble in the first step. For contention-free random access, the UE uses reserved preambles assigned by the network (e.g., the gNB or eNB). In this case, contention resolution is not needed, and thus only Message 1 and Message 2 are required.

In NR, Message 3 is scheduled by Random Access Response (RAR) uplink grant. The contents of RAR uplink grant are shown in Table 2 below. It should be noted that in NR Rel-15, the Channel State Information (CSI) request bit in the RAR uplink grant is reserved.

TABLE 2

Random Access Response Grant Content field size.
(from Table 8.2-1 of 3GPP TS 38.213)

| RAR grant field | Number of bits |
|---|---|
| Frequency hopping flag | 1 |
| PUSCH frequency resource allocation | 14 |
| PUSCH time resource allocation | 4 |
| Modulation Coding Scheme (MCS) | 4 |
| Transmission Power Control (TPC) command for PUSCH | 3 |
| CSI request | 1 |

The 'PUSCH time resource allocation' field in the RAR grant is used to indicate the timing offset and the start/length of resources allocated for Message 3. This four-bit field is used to indicate one of the rows in Table 3 which provides a time offset value $K_2$ (note that $K_2$ is given in slots), the start symbol S, and the length of the allocated resources L. The value j used to define $K_2$ depends on the subcarrier spacing of PUSCH (denoted as $\mu_{PUSCH}$) and is given in Table 4.

TABLE 3

Default PUSCH time domain resource allocation A for normal CP.
(from Table 6.1.2.1.1-2 of 3GPP TS 38.214)

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 4

Definition of value j.
(from Table 6.1.2.1.1-4 of 3GPP TS 38.214)

| $\mu_{PUSCH}$ | j |
|---|---|
| 0 | 1 |
| 1 | 1 |
| 2 | 2 |
| 3 | 3 |

FIG. 4 is a schematic diagram of the timing offset for Message 3 relative to Message 2 in the contention-based random access procedure of FIG. 3. For a PDSCH with a RAR message ending in slot n, the UE transmits the Message 3 PUSCH in slot $n+K_2+\Delta$, where $\Delta$ is given in Table 5.

TABLE 5

Definition of value j.
(from Table 6.1.2.1.1-4 of 3GPP TS 38.214)

| $\mu_{PUSCH}$ | $\Delta$ |
|---|---|
| 0 | 2 |
| 1 | 3 |
| 2 | 4 |
| 3 | 6 |

Synchronization Signal (SS) Blocks (SSBs) and SS Burst Set

In NR, a NR Primary Synchronization Signal (NR-PSS), NR Secondary Synchronization Signal (NR-SSS) and NR Physical Broadcast Channel (PBCH) (NR-PBCH) are transmitted within an SS block (an SS block can also be referred to as SS/PBCH block or SSB). An SSB spans 4 OFDM symbols with:

the NR-PSS being transmitted in 127 subcarriers in the 1st OFDM symbol of the SSB, the NR-SSS being transmitted in 127 subcarriers in the 3rd OFDM symbol of the SSB, and the NR-PBCH being transmitted in 240 subcarriers in the 2nd and 4th OFDM symbols of the SSB, and in 96 subcarriers in the 3rd OFDM symbol of the SSB.

It should be noted that the NR-PBCH consumes 576 REs which also contain the PBCH Demodulation Reference Signals (RS) (DMRS) which are used for demodulation of NR-PBCH.

An SS burst set consists of one or multiple SSBs. The default periodicity of an SS burst set is 20 ms, and the transmission of SSBs within an SS burst set is confined to a 5 ms window regardless of the periodicity of SS burst set. The maximum number L of SSBs within an SS burst set for different frequency ranges are defined as follows:

For frequency range up to 3 GHz, L is 4.

For frequency range from 3 GHz to 6 GHz, L is 8.

For frequency range from 6 GHz to 52.6 GHz, L is 64.

Quasi Co-Location

Several signals can be transmitted from the same base station antenna from different antenna ports. These signals can have the same large-scale properties, for instance in terms of Doppler shift/spread, average delay spread, or average delay. These antenna ports are then said to be Quasi Co-Located (QCL).

The network can then signal to the UE that two antenna ports are QCL. If the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement RS (known as source RS) such as CSI-RS and the second antenna port is a DMRS (known as target RS). This is useful for demodulation since the UE can know beforehand the properties of the channel when doing channel estimation with DMRS.

Information about what assumptions can be made regarding QCL is signaled to the UE from the network. In NR, four types of QCL relations between a transmitted source RS and transmitted target RS are defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them.

Channel State Information (CSI) Feedback

For CSI feedback, NR has adopted an implicit CSI mechanism where a UE feeds back the downlink CSI, typically including a transmission Rank Indicator (RI), a Precoder Matrix Indicator (PMI), and Channel Quality Indicator (CQI) for each codeword. The CQI/RI/PMI report can be either wideband or subband based on configuration.

The RI corresponds to a recommended number of layers that are to be spatially multiplexed and thus transmitted in parallel over the effective channel; the PMI identifies a recommended precoding matrix to use; and the CQI represents a recommended modulation level (e.g., Quadrature Phase Shift Keying (QPSK), 16-bit Quadrature Amplitude Modulation (16QAM), etc.) and coding rate for each codeword or transport block (TB). NR supports transmission of one or two codewords to a UE in a slot where two codewords are used for 5- to 8-layer transmission, and one codeword is used for 1- to 4-layer transmission. There is thus a relation between a CQI and a Signal-to-Interference-Plus-Noise Ratio (SINR) of the spatial layers over which the codewords are transmitted, and for two codewords there are two CQI values fed back.

CSI-RS

For CSI measurement and feedback, dedicated reference signals called CSI-RS are defined. A CSI-RS resource consists of between 1 and 32 CSI-RS ports and each port is typically transmitted on each transmit antenna (or virtual transmit antenna in case the port is precoded and mapped to multiple transmit antennas). The CSI-RS resource is used by a UE to measure the downlink channel between each of the transmit antenna ports and each of its receive antenna ports. The antenna ports are also referred to as CSI-RS ports. The supported number of antenna ports in NR is {1, 2, 4, 8, 12, 16, 24, 32}. By measuring the received CSI-RS, a UE can estimate the channel that the CSI-RS is traversing, including the radio propagation channel, potential precoding or beamforming, and antenna gains. The CSI-RS for the above purpose is also referred to as Non-Zero Power (NZP) CSI-RS but there is also Zero Power (ZP) CSI-RS used for other purposes than coherent channel measurements.

FIG. 5 is a schematic diagram of an example RE allocation for a 12-port CSI-RS resource in NR. CSI-RS can be configured to be transmitted in certain REs in a slot and certain slots. The example RE allocation is illustrated with one RE per RB per port.

CSI Framework in NR

In NR, a UE can be Radio Resource Control (RRC) configured with multiple CSI reporting settings and multiple CSI resource settings. Different CSI resource settings can be configured for channel and interference measurements. For each CSI reporting setting, a UE feeds back a CSI report.

Each CSI resource setting can contain a list of CSI resource sets where the list is a choice between one of the following:
 The list is comprised of references to either or both of NZP CSI-RS resource set(s) and SSB set(s).
 The list is comprised of references to CSI-Interference Measurement (CSI-IM) resource set(s).

Each NZP CSI-RS resource set can contain up to 8 NZP CSI-RS resources. The number of CSI-IM resources in a CSI-IM resource set is equal to the number of NZP CSI-RS resources in the NZP CSI-RS resource set used for channel measurement.

Each CSI reporting setting can contain the following information:
 An identifier of a resource setting containing NZP CSI-RS resources for channel measurement.
 Optionally, an identifier of a resource setting containing CSI-IM resources for interference measurement.
 Optionally, an identifier of a resource setting containing NZP CSI-RS resources for interference measurement.
 Time-domain behavior for CSI reporting (e.g., periodic, semi-persistent, or aperiodic reporting).
 Frequency granularity for CQI and PMI (e.g., wideband CQI vs subband CQI, and wideband PMI vs subband PMI).
 CSI parameters to be reported such as RI, PMI, CQI, Layer Indicator (LI) and CSI-RS Resource Indicator (CRI) in case of multiple NZP CSI-RS resources in a resource set.
 Codebook configuration, codebook types (e.g., type I or II), and codebook subset restriction.
 Measurement restriction.
 Information of which CQI table to use for CSI feedback (note that there are 3 different CQI tables defined in NR Rel-15 with different combination of modulation schemes and code rates suitable for different applications).

When an NZP CSI-RS resource set of a CSI resource setting for channel measurement contains multiple NZP CSI-RS resources, one of the NZP CSI-RS resources is selected by a UE. In this case, a CRI is also reported by the UE as part of the CSI report to indicate to the gNB about the selected NZP CSI-RS resource in the NZP CSI-RS resource set, together with RI, PMI and CQI associated with the selected NZP CSI-RS resource.

For aperiodic CSI reporting in NR, more than one CSI reporting setting with different CSI resource settings for channel measurement and/or CSI resource settings for interference measurement can be configured and triggered at the same time with a DCI. In this case, multiple CSI reports are aggregated and sent from the UE to the gNB in a single PUSCH transmission. This is done by defining multiple CSI triggering states, with each CSI triggering state including up to 16 CSI reporting settings in NR. A CSI request field in an uplink DCI (e.g., DCI format 0-1) is used to select one of the triggering states for CSI reporting.

In NR, the following types of CSI reporting are supported:
 Periodic CSI Reporting: CSI is reported periodically by the UE. Parameters such as periodicity and slot offset are configured semi-statically, by higher layer signaling from the gNB to the UE.
 Aperiodic CSI Reporting: This type of CSI reporting involves a single-shot (i.e., one time) CSI report by the UE which is dynamically triggered by the gNB (e.g., by the DCI in PDCCH). Some of the parameters related to the configuration of the aperiodic CSI report are semi-statically configured from the gNB to the UE but the triggering is dynamic.
 Semi-Persistent CSI Reporting: Similar to periodic CSI reporting, semi-persistent CSI reporting has a periodicity and slot offset which may be semi-statically configured by the gNB to the UE. However, a dynamic trigger from gNB to UE may be needed to allow the UE to begin semi-persistent CSI reporting. In some cases, a dynamic trigger from gNB to UE may be needed to command the UE to stop the semi-persistent transmission of CSI reports.

In NR, the following three types of CSI-RS transmissions are supported:

Periodic CSI-RS: CSI-RS is transmitted periodically in certain slots. This CSI-RS transmission is semi-statically configured using parameters such as CSI-RS resource, periodicity and slot offset.

Aperiodic CSI-RS: This is a one-shot CSI-RS transmission that can happen in any slot. Here, one-shot means that CSI-RS transmission only happens once per trigger. The CSI-RS resources for aperiodic CSI-RS are semi-statically configured. The transmission of aperiodic CSI-RS is triggered by dynamic signaling through PDCCH using the CSI request field in uplink DCI. One or multiple aperiodic CSI-RS resource(s) can be included in a CSI-RS resource set and the triggering of aperiodic CSI-RS is on a resource set basis.

Semi-Persistent CSI-RS: Similar to periodic CSI-RS, resources for semi-persistent CSI-RS transmissions are semi-statically configured with parameters such as periodicity and slot offset. However, unlike periodic CSI-RS, dynamic signaling via Medium Access Control (MAC) Coverage Enhancement (CE) activation/deactivation is needed to activate/deactivate the CSI-RS transmission.

In the case of aperiodic CSI-RS and/or aperiodic CSI reporting, the gNB RRC configures the UE with $S_c$. CSI triggering states. Each triggering state contains the aperiodic CSI report setting to be triggered along with the associated aperiodic CSI-RS resource sets.

Tracking Reference Signal (TRS)

TRS is supported in NR for the purposes of fine time synchronization, fine frequency synchronization, Doppler spread estimation and delay spread estimation. In NR specifications, a TRS is RRC configured as a CSI-RS resource where a CSI-RS configuration parameter (e.g., the parameter trs-Info according to 3GPP TS 38.331) indicates to that the CSI-RS resource can be used as a TRS.

In NR, the TRS can be either periodic or aperiodic. A periodic TRS comes in bursts with a periodicity of 10 ms, 20 ms, 40 ms, or 80 ms, wherein each burst consists of either a single slot or two slots. Within each slot in the TRS burst, the TRS is present in two OFDM symbols within the slot. Aperiodic TRS is supported in NR as a UE capability. An aperiodic TRS is scheduled via uplink DCI.

Problems with Existing Solutions

There currently exist certain challenge(s). In NR up to Release 16, CSI feedback is only possible once the UE is RRC configured with CSI reporting settings, CSI resource settings, etc. Hence, efficient transmission (including multi-layer transmission) is delayed until connection setup is established and CSI feedback is available. An open problem is how to reduce the delay in acquiring CSI so that efficient data transmission with high spectral efficiency is enabled early.

SUMMARY

Systems and methods for early Channel State Information (CSI) reporting are disclosed. In some embodiments, a method performed by a wireless device for providing early CSI reporting (e.g., CSI reporting before connection setup, such as during random access) comprises receiving, from a network, information related to (I) a CSI Reference Signal (CSI-RS), for channel measurement, (II) a CSI Interference Measurement (CSI-IM) resource, or (III) both (I) and (II), to be used for acquiring early CSI and receiving, from the network, one or more of the CSI-RS and the CSI-IM resource. The method further comprises measuring (A) a channel based on the CSI-RS, (B) interference based on at least one of the CSI-RS and the CSI-IM resource, or (C) both (A) and (B), computing CSI based on at least one of the measured channel or the measured interference, and sending a CSI report containing the CSI to the network during a random access procedure.

In some embodiments, the CSI-RS is configured as a Tracking Reference Signal (TRS).

In some embodiments, the information related to the CSI-RS comprises a time and frequency position of the CSI-RS. In some embodiments, the information related to the CSI-RS comprises a number of CSI-RS ports where the number of CSI-RS ports is more than one. In some embodiments, the information related to the CSI-RS comprises a scrambling sequence of the CSI-RS.

In some embodiments, remaining information needed to define the CSI-RS is given by specifications.

In some embodiments, the CSI-RS is transmitted in a pre-defined physical resource relative to an earlier received channel. In some embodiments, the earlier received channel is a Synchronization Signal Block (SSB) or a first System Information Block (SIB) (SIB1). In some embodiments, the CSI-RS can be measured before receiving a trigger.

In some embodiments, the information related to (I) the CSI-RS for channel measurement, (II) the CSI-IM resource, or (III) both (I) and (II) is carried in a SIB.

In some embodiments, the information related to the CSI-RS comprises an indication of: (a) one or more default CSI reporting settings for a CSI, (b) one or more default CSI resource settings containing information of the CSI-RS, or (c) both (a) and (b). In some embodiments, the method further comprises receiving, from the network via Message 2 of the random access procedure, a triggering of receiving at least one of the CSI-RS or the CSI-IM, and transmitting an associated CSI report. In some embodiments, one or more of the following apply: the CSI is an aperiodic CSI; the CSI-RS is an aperiodic CSI-RS; the CSI-IM resource is an aperiodic CSI-IM; and the CSI report is an aperiodic CSI report. In some embodiments, one or more of the following apply: measuring the channel and interference comprises measuring the channel based on the aperiodic CSI-RS and the interference based on the aperiodic CSI-RS or the aperiodic CSI-IM, and using the measurements to compute the CSI for the aperiodic CSI report; and sending the CSI report containing the CSI to the network during the random access procedure comprises sending the aperiodic CSI report on Message 3 of the random access procedure to the network.

In some embodiments, receiving, from the network, information related to (I) the CSI-RS for channel measurement, (II) the CSI-IM resource, or (III) both (I) and (II), to be used for acquiring early CSI comprises receiving an indication, from the network, of: (a) one or more default CSI reporting settings for an aperiodic CSI, (b) one or more default CSI resource settings containing information of an associated aperiodic CSI-RS and/or an associated aperiodic CSI-IM, or (c) a combination of (a) and (b). Receiving, from the network, the CSI-RS comprises receiving, from the network via Message 2 of the random access procedure, a triggering of receiving at least one of the aperiodic CSI-RS or the aperiodic CSI-IM, and transmitting an associated aperiodic CSI report. Measuring (A) the channel based on the CSI-RS, (B) the interference based on at least one of the CSI-RS and the CSI-IM resource, or (C) both (A) and (B) comprises measuring at least one of a channel or interference on the aperiodic CSI-RS or aperiodic CSI-IM and using the measurements to compute the CSI for the aperiodic CSI report. Sending the aperiodic CSI report containing the CSI to the network during the random access procedure comprises sending the aperiodic CSI report on Message 3 of the random access procedure to the network.

In some embodiments, receiving the indication of one or more default CSI reporting settings or one or more default CSI resource settings is done via a SIB. In some embodiments, the SIB is a SIB1.

In some embodiments, the number of ports associated with the aperiodic CSI-RS is one or more.

In some embodiments, a subset of bits in a Downlink Control Information (DCI) scrambled by a Random Access Radio Network Temporary Identifier (RA-RNTI) is used to select a particular default CSI reporting setting when more than one default CSI reporting setting is indicated. In some embodiments, a subset of bits in a DCI scrambled by a RA-RNTI is used to select a particular default CSI resource setting for channel measurement when more than one default CSI resource setting for channel measurement is indicated. In some embodiments, a subset of bits in a DCI scrambled by a RA-RNTI is used to select a particular default CSI resource setting for interference measurement when more than one default CSI resource setting for interference measurement are indicated.

In some embodiments, each default CSI reporting setting or the related CSI resource setting for channel measurement corresponds to CSI feedback for a different number of antenna ports.

In some embodiments, the aperiodic CSI report on Message 3 is restricted to report only wideband Channel Quality Indicator (CQI) and wideband Precoder Matrix Indicator (PMI). In some embodiments, the aperiodic CSI report on Message 3 is restricted to report only at least one of wideband CQI or wideband PMI when the number of antenna ports is less than or equal to eight. In some embodiments, the aperiodic CSI report on Message 3 is restricted to report only: (a) subband CQI, (b) subband PMI, or (c) both (a) and (b), when the number of antenna ports is less than or equal to four.

In some embodiments, a Type-D Quasi Co-Located (QCL) source for the aperiodic CSI-RS and the aperiodic CSI-IM triggered by Message 2 is a SSB that was acquired during initial access.

In some embodiments, Message 2 additionally triggers an aperiodic TRS.

In some embodiments, the aperiodic TRS serves as a Type-A QCL source to the aperiodic CSI-RS.

In some embodiments, the aperiodic TRS serves as Type-D QCL source to the aperiodic CSI-RS and the aperiodic CSI-IM.

In some embodiments, a 'Physical Uplink Shared Channel (PUSCH) time resource allocation' field in a Random Access Response (RAR) grant in Message 2 is used to jointly indicate timing offsets for an aperiodic Non-Zero Power (NZP) CSI-RS/aperiodic CSI-IM and Message 3.

In some embodiments, a subset of bits in a DCI scrambled by a RA-RNTI is used to indicate a timing offset of one or more of the aperiodic CSI-RS and the aperiodic CSI-IM.

In some embodiments, a 'PUSCH time resource allocation' field in a RAR grant in Message 2 is used to jointly indicate timing offsets for aperiodic TRS, aperiodic NZP CSI-RS/aperiodic CSI-IM, and Message 3.

In some embodiments, a subset of bits in a DCI scrambled by a RA-RNTI is used to indicate a timing offset of one or more of an aperiodic TRS, the aperiodic CSI-RS, and the aperiodic CSI-IM.

In some embodiments, a wireless device is provided for providing CSI reporting in a random access procedure, where the wireless device comprises processing circuitry configured to perform the steps of any of the above embodiments; and power supply circuitry configured to supply power to the wireless device.

In some embodiments, a method is performed by a base station for receiving CSI reporting in a random access procedure. The method comprises configuring a CSI-RS to be used for acquiring early CSI and transmitting information related to (I) the CSI-RS for channel measurement, (II) a CSI-IM resource, or (III) both (I) and (II), to a wireless device. The method further comprises transmitting at least one of the CSI-RS or the CSI-IM resource to the wireless device and receiving a CSI report during the random access procedure, the CSI report comprising at least one of a channel measurement or an interference measurement on at least one of the CSI-RS or the CSI-IM resource.

In some embodiments, the CSI-RS is configured as a TRS.

In some embodiments, the information related to the CSI-RS comprises a time and frequency position of the CSI-RS.

In some embodiments, the information related to the CSI-RS comprises a number of CSI-RS ports where the number of CSI-RS ports is more than one.

In some embodiments, the information related to the CSI-RS comprises a scrambling sequence of the CSI-RS.

In some embodiments, remaining information needed to define the CSI-RS is given by specifications.

In some embodiments, the CSI-RS is transmitted in a pre-defined physical resource relative to an earlier received channel. In some embodiments, the earlier received channel is a SSB or a SIB1.

In some embodiments, the information related to (I) the CSI-RS for channel measurement, (II) the CSI-IM resource, or (III) both (I) and (II) is carried in a SIB.

In some embodiments, the information related to the CSI-RS comprises an indication of: (a) one or more default CSI reporting settings for a CSI, (b) one or more default CSI resource settings containing information of the CSI-RS, or (c) both (a) and (b). In some embodiments, the method further comprises transmitting, to the wireless device via Message 2 of the random access procedure, a triggering of at least one of the CSI-RS or the CSI-IM, and an associated CSI report. In some embodiments, one or more of the following further apply: the CSI is an aperiodic CSI; the CSI-RS is an aperiodic CSI-RS; the CSI-IM resource is an aperiodic CSI-IM; and the CSI report is an aperiodic CSI report. In some embodiments, receiving the CSI report during the random access procedure comprises receiving the aperiodic CSI report on Message 3 of the random access procedure from the wireless device.

In some embodiments, transmitting the indication of one or more default CSI reporting settings and one or more default CSI resource settings is done via a SIB. In some embodiments, the SIB is a SIB1.

In some embodiments, the number of ports associated with the aperiodic CSI-RS is one or more.

In some embodiments, a subset of bits in a DCI scrambled by a RA-RNTI is used to select a particular default CSI reporting setting when more than one default CSI reporting setting is indicated.

In some embodiments, a subset of bits in a DCI scrambled by a RA-RNTI is used to select a particular default CSI resource setting for channel measurement when more than one default CSI resource setting for channel measurement is indicated.

In some embodiments, a subset of bits in a DCI scrambled by a RA-RNTI is used to select a particular default CSI resource setting for interference measurement when more than one default CSI resource setting for interference measurement are indicated.

In some embodiments, each default CSI reporting setting and the related CSI resource setting for channel measurement corresponds to CSI feedback for a different number of antenna ports.

In some embodiments, the aperiodic CSI report on Message 3 is restricted to report only wideband CQI and wideband PMI.

In some embodiments, the aperiodic CSI report on Message 3 is restricted to report only: (a) wideband CQI, (b) wideband PMI, or (c) both (a) and (b) when the number of antenna ports is less than or equal to eight.

In some embodiments, the aperiodic CSI report on Message 3 is restricted to report only: (a) subband CQI, (b) subband PMI, or (c) both (a) and (b) when the number of antenna ports is less than or equal to four.

In some embodiments, a Type-D QCL source for the aperiodic CSI-RS and the aperiodic CSI-IM triggered by Message 2 is a SSB that was transmitted during initial access.

In some embodiments, Message 2 additionally triggers an aperiodic TRS.

In some embodiments, the aperiodic TRS serves as a Type-A QCL source to the aperiodic CSI-RS.

In some embodiments, the aperiodic TRS serves as Type-D QCL source to the aperiodic CSI-RS and the aperiodic CSI-IM.

In some embodiments, a 'PUSCH time resource allocation' field in a RAR grant in Message 2 is used to jointly indicate timing offsets for an aperiodic NZP CSI-RS/aperiodic CSI-IM and Message 3.

In some embodiments, a subset of bits in a DCI scrambled by a RA-RNTI is used to indicate a timing offset of one or more of the aperiodic CSI-RS and the aperiodic CSI-IM.

In some embodiments, a 'PUSCH time resource allocation' field in a RAR grant in Message 2 is used to jointly indicate timing offsets for one or more of aperiodic TRS, aperiodic NZP CSI-RS/aperiodic CSI-IM, and Message 3.

In some embodiments, a subset of bits in a DCI scrambled by a RA-RNTI is used to indicate a timing offset of one or more of an aperiodic TRS, the aperiodic CSI-RS, and the aperiodic CSI-IM.

In some embodiments, a base station is provided for receiving CSI reporting in a random access procedure, the base station comprising: processing circuitry configured to perform the steps of any of the above embodiments; and power supply circuitry configured to supply power to the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
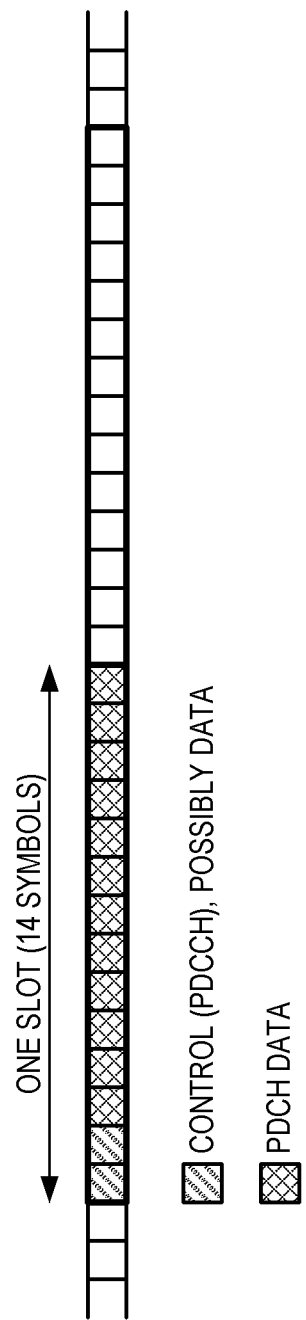
FIG. 1 is a schematic diagram of an exemplary New Radio (NR) time-domain structure having 15 kilohertz (kHz) subcarrier spacing.
Figure 2:
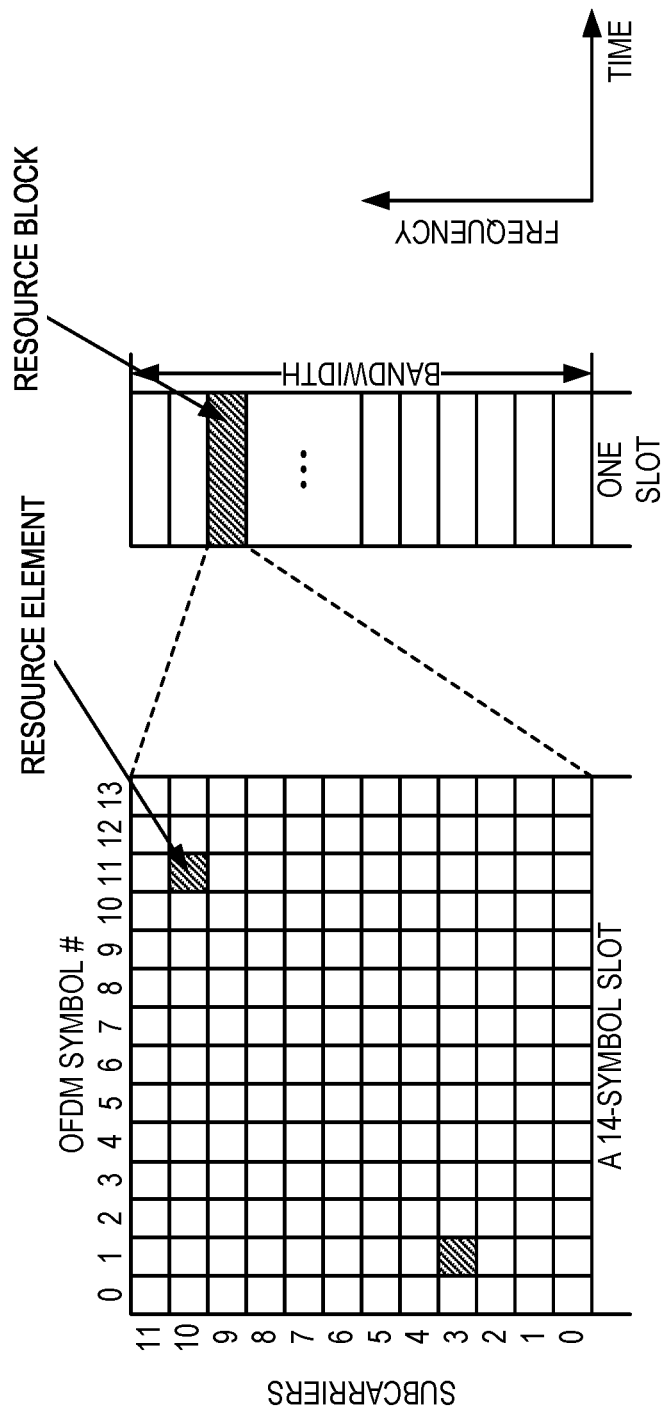
FIG. 2 is a schematic diagram of a NR physical time-frequency resource grid.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods for early Channel State Information (CSI) feedback in NR are provided. As described herein, early CSI feedback refers to providing CSI reporting before connection setup of a UE. In embodiments of the disclosure, CSI reporting is performed during a random access procedure to provide the early CSI feedback and enable more efficient data transmission with higher spectral efficiency in earlier communications. In some examples, CSI reporting can be reported on Message 3 of the random access procedure after measuring channel and/or interference on a CSI Reference Signal (RS) (CSI-RS) during the random access procedure.

Certain embodiments may provide one or more of the following technical advantage(s). The proposed solution allows early CSI to be triggered when the UE performs initial access to a serving cell. With the early CSI acquired, the network can perform proper link adaptation including Multiple Input Multiple Output (MIMO) precoding, and ensure efficient data transmission without having to wait until connection setup and configuration of the CSI framework is established.

Figure 6:
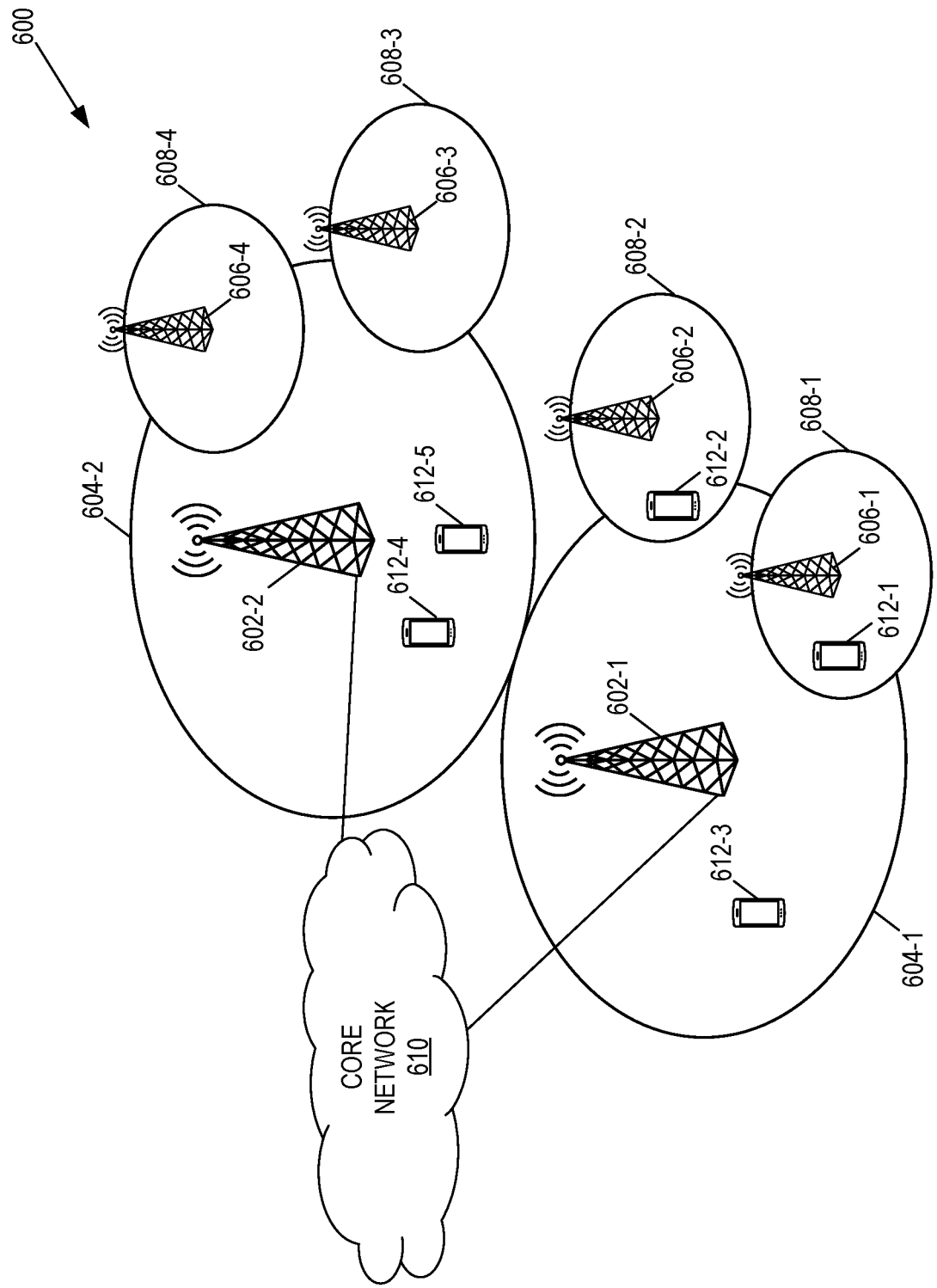
FIG. 6 illustrates one example of a cellular communications system in which embodiments of the present disclosure may be implemented.

FIG. 6 illustrates one example of a cellular communications system 600 in which embodiments of the present disclosure may be implemented. In the embodiments described herein, the cellular communications system 600 is a 5G system (5GS) including a NR RAN or LTE RAN (i.e., Evolved Universal Terrestrial Radio Access (E-UTRA) RAN) or an Evolved Packet System (EPS) including a LTE RAN. In this example, the RAN includes base stations 602-1 and 602-2, which in LTE are referred to as eNBs (when connected to EPC) and in 5G NR are referred to as gNBs (e.g., LTE RAN nodes connected to 5G Core (5GC), which are referred to as gn-eNBs), controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5GS is referred to as the SGC. The base stations 602 (and optionally the low power nodes 606) are connected to the core network 610.

The base stations 602 and the low power nodes 606 provide service to wireless devices 612-1 through 612-5 in the corresponding cells 604 and 608. The wireless devices 612-1 through 612-5 are generally referred to herein collectively as wireless devices 612 and individually as wireless device 612. The wireless devices 612 are also sometimes referred to herein as UEs.

General Embodiment

Figure 7:
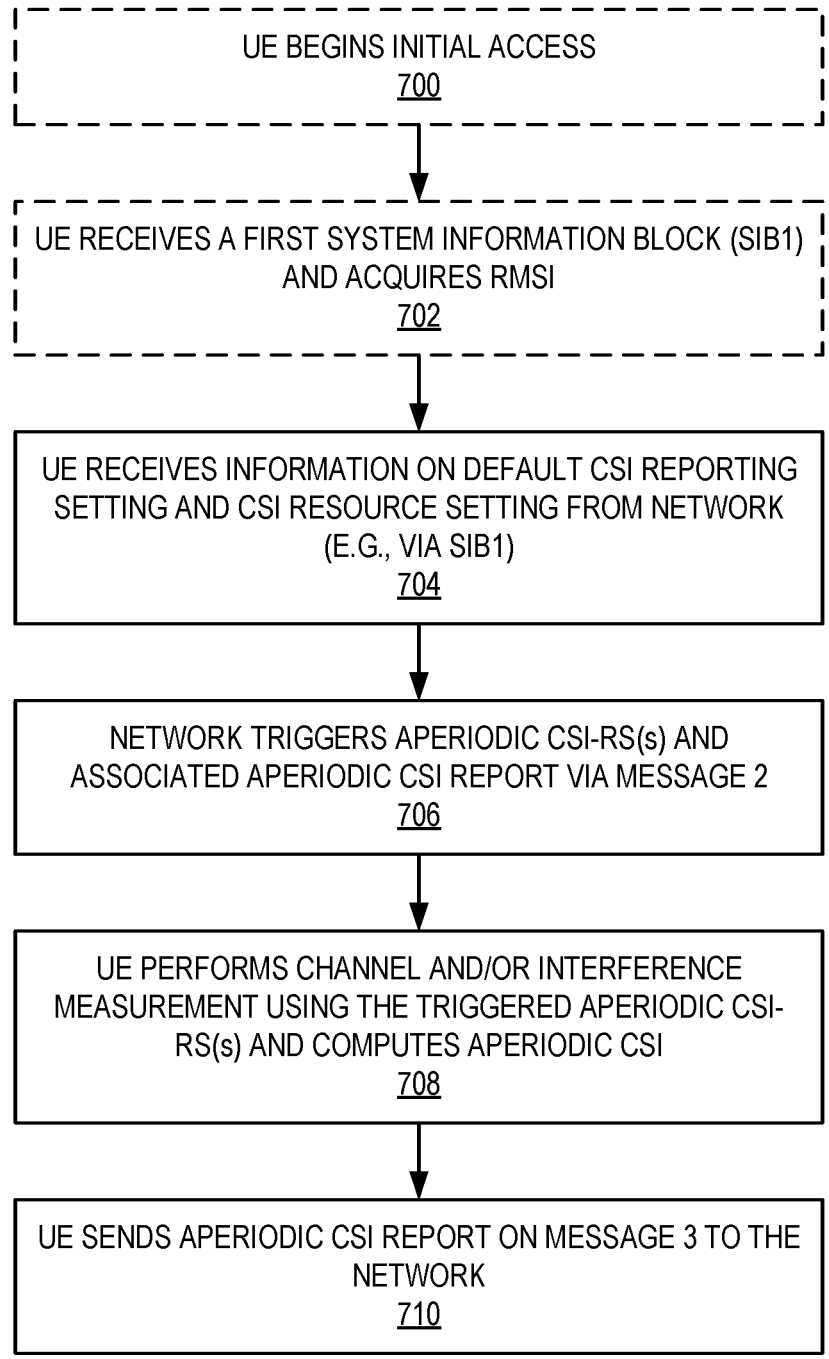
FIG. 7 is a flow diagram illustrating a general method for acquiring early CSI feedback in NR.

FIG. 7 is a flow diagram illustrating a general method for acquiring early Channel State Information (CSI) feedback in NR. Dashed boxes represent optional steps. The method may optionally begin at step 700, in which a UE (e.g., one of the wireless devices 612-1 through 612-5 of FIG. 6) begins initial access. During initial access the UE searches for and finds a Synchronization Signal Block (SSB) for a cell (e.g., the corresponding cell 604 or 608 of the wireless devices 612-1 through 612-5 of FIG. 6), from which it acquires a Physical Cell Identity (PCI) of the found cell and some information in an associated Master Information Block (MIB). Secondly, at step 702 the UE may optionally receive a first System Information Block (SIB) (SIB1), and acquires Remaining Minimum System Information (RMSI) containing information on how to access the cell.

Then, in step 704 of the method, the UE receives information on default CSI reporting setting(s) and an associated CSI resource setting(s) from the network (e.g., a gNB for the cell, such as base station 602-1 or 602-2 in FIG. 6) via SIB1 to be used for the purpose of acquiring early CSI. The information in SIB1 may include the number of CSI Reference Signal (CSI-RS) ports (e.g., 1, 2, 4, 8, etc.) associated with the early CSI as well as other parameters related to a CSI-RS. In this manner, the UE receives information related to a CSI-RS to be used for acquiring the early CSI using the existing CSI framework in NR. This information related to the CSI-RS may alternatively be the time and frequency position of the CSI-RS, and/or the number of CSI-RS ports where the number of ports can be more than 1 (e.g., 2, 4, 8, etc.), scrambling sequence, etc. Note that in this alternative, the configuration possibility of the CSI-RS is small, the SIB1 may for example only contain an indication of the number of CSI-RS ports, the rest of the information needed to define a CSI-RS is given by specifications. The CSI-RS may be configured as a standalone CSI-RS, i.e. outside the normal CSI-RS framework. The CSI-RS sequence may for instance be initialized by a function of the PCI value. However, in embodiments reusing the existing CSI framework more flexibility is obtained at the expense of larger SIB1 overhead.

Figure 3:
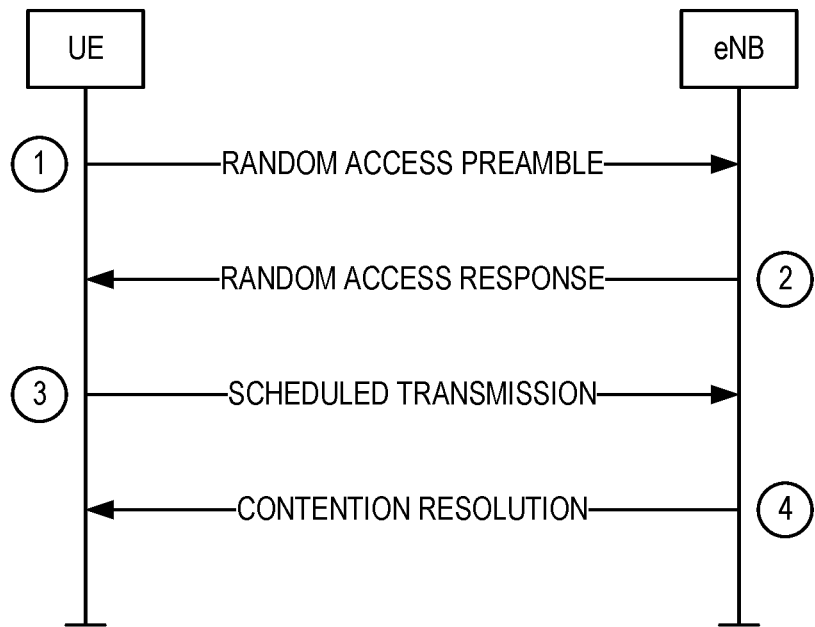
FIG. 3 is a flow diagram of a contention-based random access procedure under Long Term Evolution (LTE) and NR.
Figure 4:
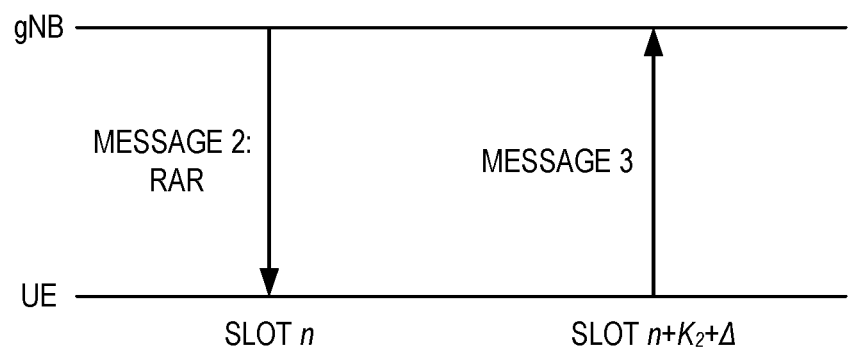
FIG. 4 is a schematic diagram of a timing offset for Message 3 relative to Message 2 in the contention-based random access procedure of FIG. 3.
Figure 5:
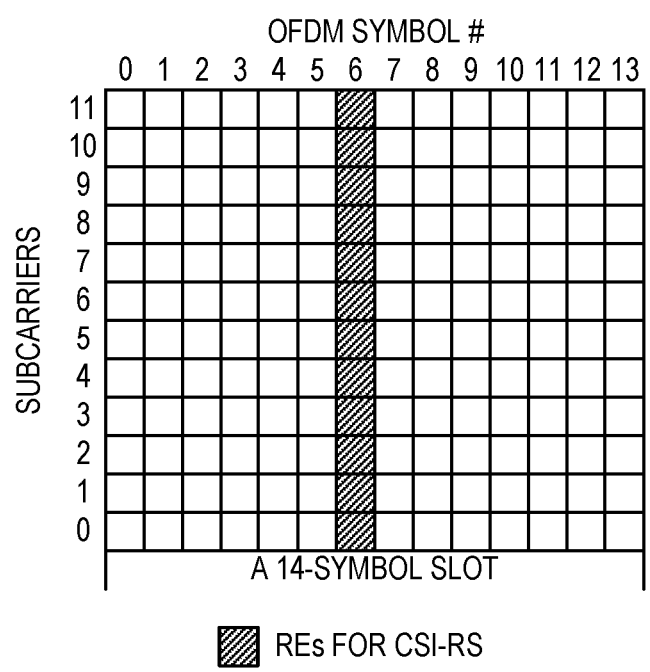
FIG. 5 is a schematic diagram of an example Resource Element (RE) allocation for a 12-port Channel State Information (CSI) Reference Signal (RS) (CSI-RS) resource in NR.

In step 706 of the method, the network (e.g., the gNB) triggers one or more aperiodic CSI-RS(s) and associated aperiodic CSI report (e.g., to be used for channel and interference measurement) using Message 2 of the 4-step random access procedure of FIG. 3. In this case, the trigger may be triggered by the CSI request field in Message 2. The aperiodic CSI-RS(s) may either be received in the same slot in which a Physical Downlink Control Channel (PDCCH) for Message 2 is triggered or in a slot after the slot in which the PDCCH for Message 2 is received. In this manner, the UE receives and measures on the CSI-RS configured by SIB1. Alternatively, the CSI-RS is not aperiodically triggered, and instead the CSI-RS is transmitted in a pre-defined time/frequency position (physical resource) relative to one of the earlier received channels (e.g., SSB, SIB1). Hence, the UE can in this alternative directly measure on the CSI-RS after acquiring SIB1 information without the need to receive a trigger. A drawback of this alternative is that CSI-RS needs to always be transmitted by the network (e.g., in association with SIB1). In order to be energy efficient and avoid unnecessary transmission, a beneficial position of this CSI-RS is in OFDM symbol(s) close to, or adjacent to SSB or SIB1.

In step 708 of the method, the UE performs channel and/or interference measurement using the triggered aperiodic CSI-RS(s) and computes aperiodic CSI. The UE can perform a channel measurement on the Non-Zero Power (NZP) CSI-RS(s) that are part of a default CSI resource setting for channel measurement. In addition, step 708 may optionally involve the UE performing an interference measurement used for the CSI report, in at least one of the following two ways:

the UE performs interference measurement on the aperiodic CSI-Interference Measurement (CSI-IM) resource(s) that are part of a default CSI resource setting for interference measurement; or the UE performs interference measurement on the aperiodic NZP CSI-RS(s) that are part of a default CSI resource setting for interference measurement.

Upon completing channel and interference measurements, the UE computes an aperiodic CSI according to a default CSI report setting in step 708.

In step 710 of the method, the UE sends the aperiodic CSI report as part of Message 3 to the network. The UE can alternatively send the aperiodic CSI report as a separate Physical Uplink Shared Channel (PUSCH) transmission scheduled by a PDCCH.

The general method for acquiring early CSI feedback in NR illustrated in FIG. 7 may be further modified as described further below with respect to a first embodiment (early triggering of the CSI-RS/CSI report), a second embodiment (Quasi Co-Location (QCL) relation for early triggered CSI-RS), a third embodiment (timing offset indication of different RSs triggered by Message 2), and a fourth embodiment (triggering of aperiodic Zero Power (ZP) CSI-RS). It should be understood that further alternatives and modifications of the general method are within the scope of this disclosure, as will be understood by one of skill in the art.

First Embodiment: Early Triggering of CSI-RS/CSI Report

In the first embodiment, an N1 port aperiodic CSI-RS and/or an aperiodic CSI report are triggered via Message 2. In NR, Message 2 (also known as Random Access Response (RAR) message) is scheduled by a Downlink Control Information (DCI) with format 1_0 which has its Cyclic Redundancy Checksum (CRC) scrambled by Random Access Radio Network Temporary Identifier (RA-RNTI). Note that a DCI with format 1_0 and scrambled by RA-RNTI has 16 reserved bits.

In one variant of this embodiment, information on multiple default CSI reporting setting(s) and CSI resource setting(s) are indicated to the UE from the gNB via SIB1. Which particular default CSI reporting setting and CSI resource setting to use for early CSI reporting is selected by a subset of the reserved bits in DCI (with format 1_0) scrambled by RA-RNTI. Consider the following example where 4 different default CSI reporting setting(s) and CSI resource setting(s) are indicated to the UE from gNB via SIB1:

Default CSI report setting 0 and corresponding CSI resource setting 0 for channel measurement (possibly an additional CSI resource setting 0a for interference measurement)—this corresponds to aperiodic CSI reporting for 1 antenna port.

Default CSI report setting 1 and corresponding CSI resource setting 1 for channel measurement (possibly an additional CSI resource setting 1a for interference measurement)—this corresponds to aperiodic CSI reporting for 2 antenna ports.

Default CSI report setting 2 and corresponding CSI resource setting 2 (possibly an additional CSI resource setting 2a for interference measurement)—this corresponds to aperiodic CSI reporting for 4 antenna ports.

Default CSI report setting 3 and corresponding CSI resource setting 3 (possibly an additional CSI resource setting 3a for interference measurement)—this corresponds to aperiodic CSI reporting for 8 antenna ports In this example, 2 of the 16 reserved bits in DCI (with format 1_0) scrambled by RA-RNTI are used to select one of the default CSI reporting setting and default CSI resource setting. This may be implemented in the standard by introducing a "CSI request" field in DCI Format 1_0 scrambled with RA-RNTI. The benefit of this embodiment is that early aperiodic CSI reports corresponding to different numbers of antenna ports can be flexibly triggered by the gNB via Message 2. Note that if only a single default CSI reporting setting(s) and CSI resource setting(s) is indicated to the UE from the gNB via SIB1, then the reserved bits in DCI (with format 1_0) scrambled by RA-RNTI are not used to select one of the default CSI reporting setting and default CSI resource setting.

In an alternative embodiment, a set of default CSI reporting setting and corresponding CSI resource setting(s) are predefined in specifications. Each of these predefined default CSI reporting setting(s)/CSI resource setting(s) may correspond to CSI feedback for different numbers of antenna ports. In this alternative embodiment, one of the default CSI reporting setting and corresponding CSI resource setting(s) is indicated to the UE by the gNB via SIB1.

In one embodiment, the CSI request bit in the RAR uplink grant is used to jointly trigger a default CSI reporting setting and CSI resource setting(s) indicated to the UE from the gNB via SIB1.

Since the aperiodic CSI report in this embodiment is to be carried on Message 3 where the PUSCH may carry early data and where PUSCH resource allocation may be limited, it may be beneficial to limit the aperiodic CSI report to a wideband report.

Hence, in some embodiments, Channel Quality Information (CQI) and Precoder Matrix Indicator (PMI) reports are both limited to wideband in the default CSI reporting settings (e.g., the cqi-FormatIndicator is restricted to widebandCQI, and pmi-FormatIndicator is limited to widebandPMI).

In one embodiment, the CSI may be multiplexed with Message 3 data in physical layer, where a power offset between the CSI and Message 3 data may be applied. The power offset may be either pre-specified or signaled in SIB1. In another embodiment, the CSI may be included in a Medium Access Control (MAC) Coverage Enhancement (CE) as part of a MAC Protocol Data Unit (PDU) carrying Message 3.

In another embodiment, the CSI report may be triggered after Message 3 (e.g., with an uplink grant, such as DCI 0-0), and may be used to request a CSI feedback. The CSI request may be implicitly indicated by using one or more existing fields in the DCI. For example, a CSI request can be indicated when $28 \leq I_{MCS} \leq 31$, the "New data indicator" is set to 0, and/or the "Redundancy version" is set to 0. A default Modulation Coding Scheme (MCS) may be used for the corresponding PUSCH.

A default reference signal may be used for CSI measurement such as a CSI-RS, a Tracking Reference Signal (TRS), SSB, or Demodulation Reference Signal (DMRS). In some cases, only CQI may be reported if a single port is used in the reference signal.

Second Embodiment: QCL Relation for Early Triggered CSI-RS

In the second embodiment, the aperiodic NZP CSI-RS and the aperiodic CSI-IM triggered by Message 2 assumed by the UE to be QCL with the SSB that was acquired during initial access. Note that the aperiodic NZP CSI-RS and the aperiodic CSI-IM are part of the default CSI resource setting for channel measurement and the default CSI resource setting for interference measurement, respectively. In the above case, the SSB that was acquired during initial access serves as the QCL-Type D source to the aperiodic NZP CSI-RS and the aperiodic NZP CSI-IM. That is, the UE can use the same received beam that it used to receive the SSB to receive the aperiodic NZP CSI-RS and aperiodic CSI-IM.

Figure 8:
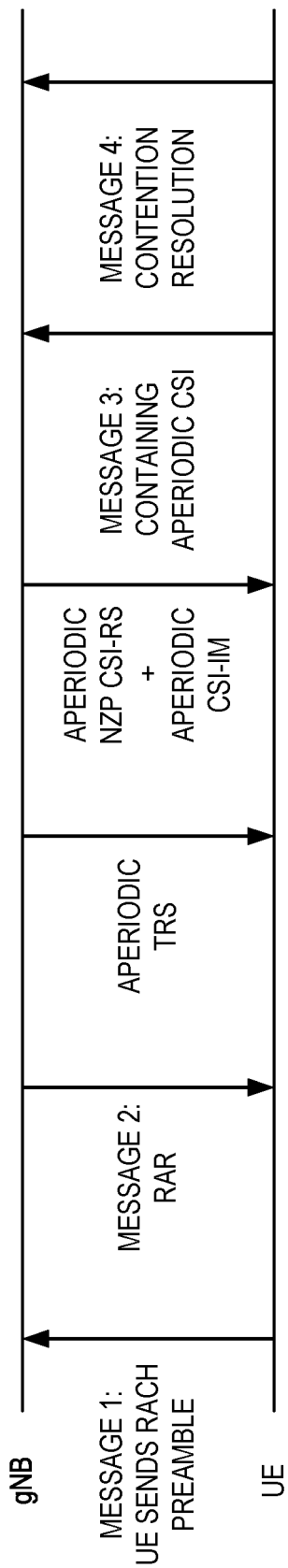
FIG. 8 is a schematic diagram of timing offsets for an example of a second embodiment, where Message 2 is used to trigger an aperiodic Timing Reference Signal (TRS) in addition to an aperiodic Non-Zero Power (NZP) CSI-RS and an aperiodic CSI Interference Measurement (CSI-IM).

FIG. 8 is a schematic diagram of timing offsets for an example of the second embodiment, where Message 2 is used to trigger an aperiodic TRS in addition to the aperiodic NZP CSI-RS and the aperiodic CSI-IM. In this example, Message 2 triggers the aperiodic TRS prior to the aperiodic NZP CSI-RS and the aperiodic CSI-IM. In this example, the aperiodic TRS serves as the QCL-Type A source to the aperiodic NZP CSI-RS. That is, the UE measures Doppler shift, Doppler spread, average delay, and delay spread using the aperiodic TRS and assumes these channel properties hold when performing channel estimation on the aperiodic NZP CSI-RS. In some variants of this embodiment, the aperiodic TRS also serves as the QCL-Type D source to the aperiodic NZP CSI-RS and the aperiodic NZP CSI-IM.

Third Embodiment: Timing Offset Indication of Different RSs Triggered by Message 2

In NR Rel-15, for a PDSCH with Message 2 (e.g., RAR message) ending in slot n, the UE transmits the Message 3 PUSCH in slot $n+K_2+\Delta$. However, CSI is not carried in Message 3 in NR Rel-15.

Figure 9:
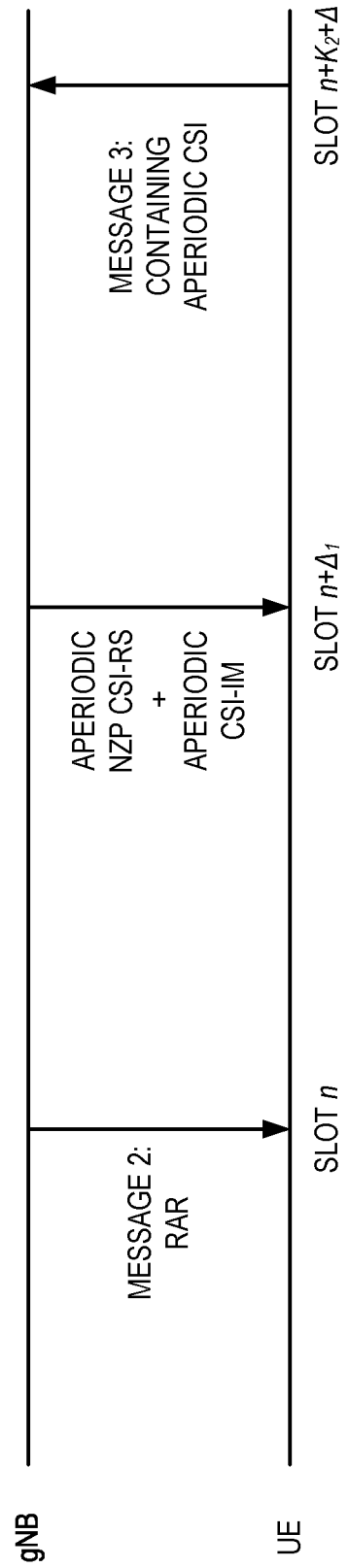
FIG. 9 is a schematic diagram of timing offsets for an example of a third embodiment, where Message 2 triggers the aperiodic NZP CSI-RS/aperiodic CSI-IM and aperiodic CSI in Message 3.

FIG. 9 is a schematic diagram of timing offsets for an example of the third embodiment, where Message 2 triggers the aperiodic NZP CSI-RS/aperiodic CSI-IM and aperiodic CSI in Message 3. For this example, the timing offsets of aperiodic NZP CSI-RS/aperiodic CSI-IM need to be indicated. Hence, in one embodiment, the 'PUSCH time resource allocation' field in RAR grant is used to jointly indicate the timing offsets for aperiodic NZP CSI-RS/aperiodic CSI-IM and Message 3. Considering the example in FIG. 9, the timing offset $\Delta_1$ for aperiodic NZP CSI-RS/aperiodic CSI-IM and the timing offset $K_2$ are jointly indicated using the 'PUSCH time resource allocation' field in the RAR grant. In an alternate embodiment, a subset of the 16 reserved bits in DCI (with format 1_0) scrambled by RA-RNTI are used to indicate the timing offset of the aperiodic NZP CSI-RS/aperiodic CSI-IM.

In the example of FIG. 9, the aperiodic NZP CSI-RS/ aperiodic CSI-IM are indicated in the same slot. However, the example can readily be extended for a case where aperiodic NZP CSI-RS and aperiodic CSI-IM are indicated in different slots. In this case, two different offsets corresponding to aperiodic NZP CSI-RS and aperiodic CSI-IM will be indicated using one of the following:

'PUSCH time resource allocation' field in RAR grant indicates two offsets corresponding to the aperiodic NZP CSI-RS and the aperiodic CSI-IM. Note that these offsets are jointly indicated with $K_2$.

A subset of the 16 reserved bits in DCI (with format 1_0) scrambled by RA-RNTI are used to indicate the two different offsets corresponding to aperiodic NZP CSI-RS and aperiodic CSI-IM.

Note that, in some embodiments, if aperiodic CSI-IM is not triggered in Message 2, then only a single offset corresponding to aperiodic NZP CSI-RS is indicated.

In addition, since aperiodic CSI needs to be computed before sending Message 3, in some embodiments the range of values of the timing offsets $K_2$ and $\Delta$ for Message 3 are extended beyond the value range supported in NR Rel-15 when aperiodic CSI is triggered by Message 2.

Figure 10:
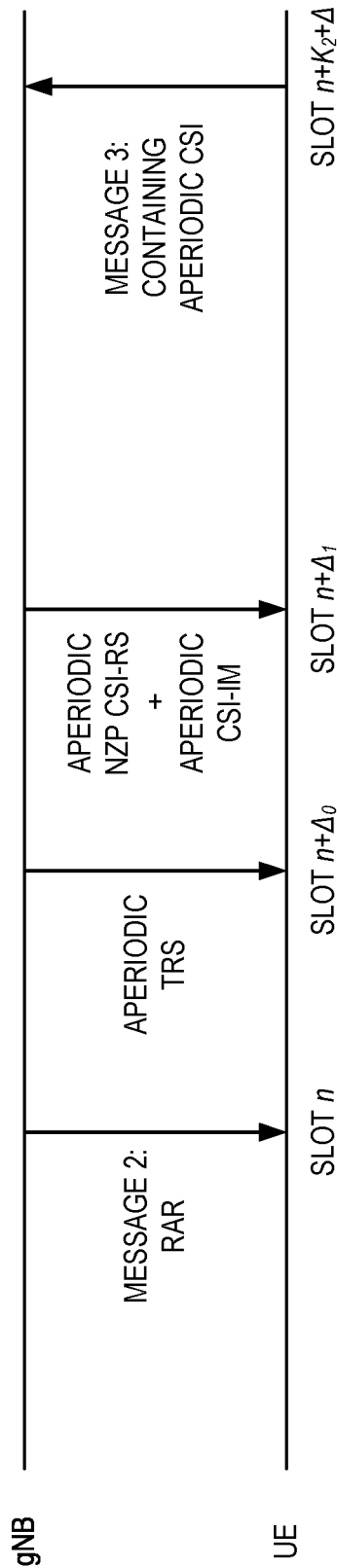
FIG. 10 is a schematic diagram of timing offsets for another example of the third embodiment, where Message 2 triggers the aperiodic TRS, the aperiodic NZP CSI-RS/aperiodic CSI-IM, and aperiodic CSI in Message 3.

FIG. 10 is a schematic diagram of timing offsets for another example of the third embodiment, where Message 2 triggers the aperiodic TRS, the aperiodic NZP CSI-RS/ aperiodic CSI-IM, and aperiodic CSI in Message 3. For this example, the timing offsets of aperiodic TRS and aperiodic NZP CSI-RS/aperiodic CSI-IM need to be indicated. In one embodiment, the 'PUSCH time resource allocation' field in the RAR grant is used to jointly indicate the timing offsets for the aperiodic TRS, the aperiodic NZP CSI-RS/aperiodic CSI-IM, and Message 3. Considering the example in FIG. 10, the timing offset $\Delta_0$ for aperiodic TRS, the timing offset $\Delta_1$ for aperiodic NZP CSI-RS/aperiodic CSI-IM, and the timing offset $K_2$ are jointly indicated using the 'PUSCH time resource allocation' field in the RAR grant. In an alternate embodiment, a subset of the 16 reserved bits in DCI (with format 1_0) scrambled by RA-RNTI are used to indicate the timing offsets of the aperiodic TRS and the aperiodic NZP CSI-RS/aperiodic CSI-IM.

Fourth Embodiment: Triggering of Aperiodic ZP CSI-RS

According to the current Rel-16 NR specification, the aperiodic CSI-RS and CSI-IM can only be triggered via DCI Format 0_1 using the CSI request field. Thus, aperiodic NZP CSI-RS and CSI-IM do not rate match (e.g., RE map) around PDSCH. If the gNB triggers the aperiodic NZP CSI-RS and/or CSI-IM which overlap with PDSCH, the gNB must indicate the rate matching via triggering an aperiodic ZP CSI-RS in the DCI Format 1_1 which schedules the PDSCH.

In order to achieve rate matching around the triggered aperiodic NZP CSI-RS and/or CSI-IM for the PDSCH carrying Message 2, the UE may in one embodiment also receive an aperiodic ZP CSI-RS trigger in Message 2.

Figure 11:
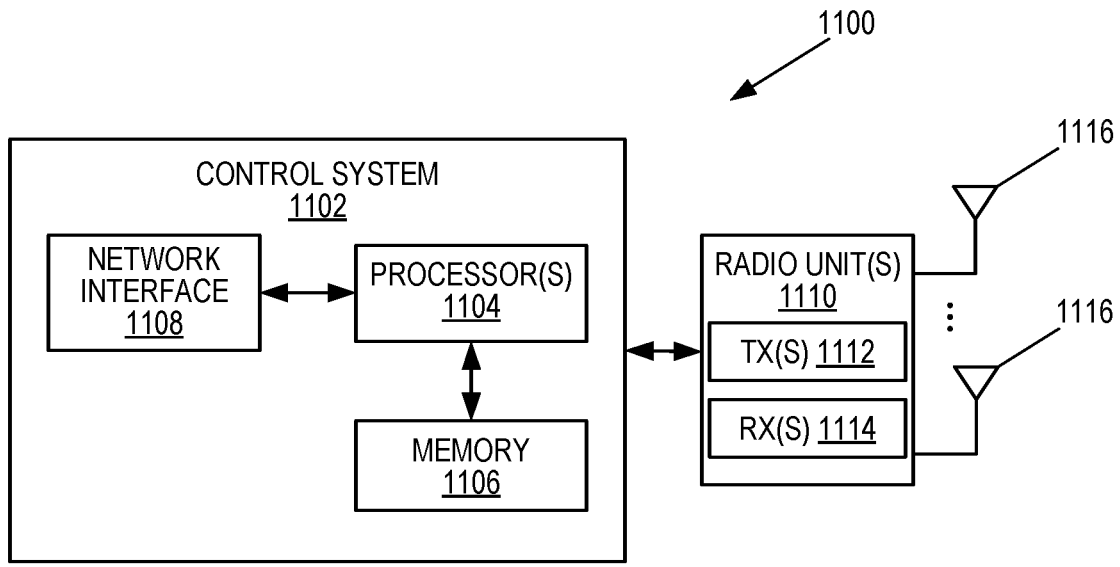
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 602 or 606. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
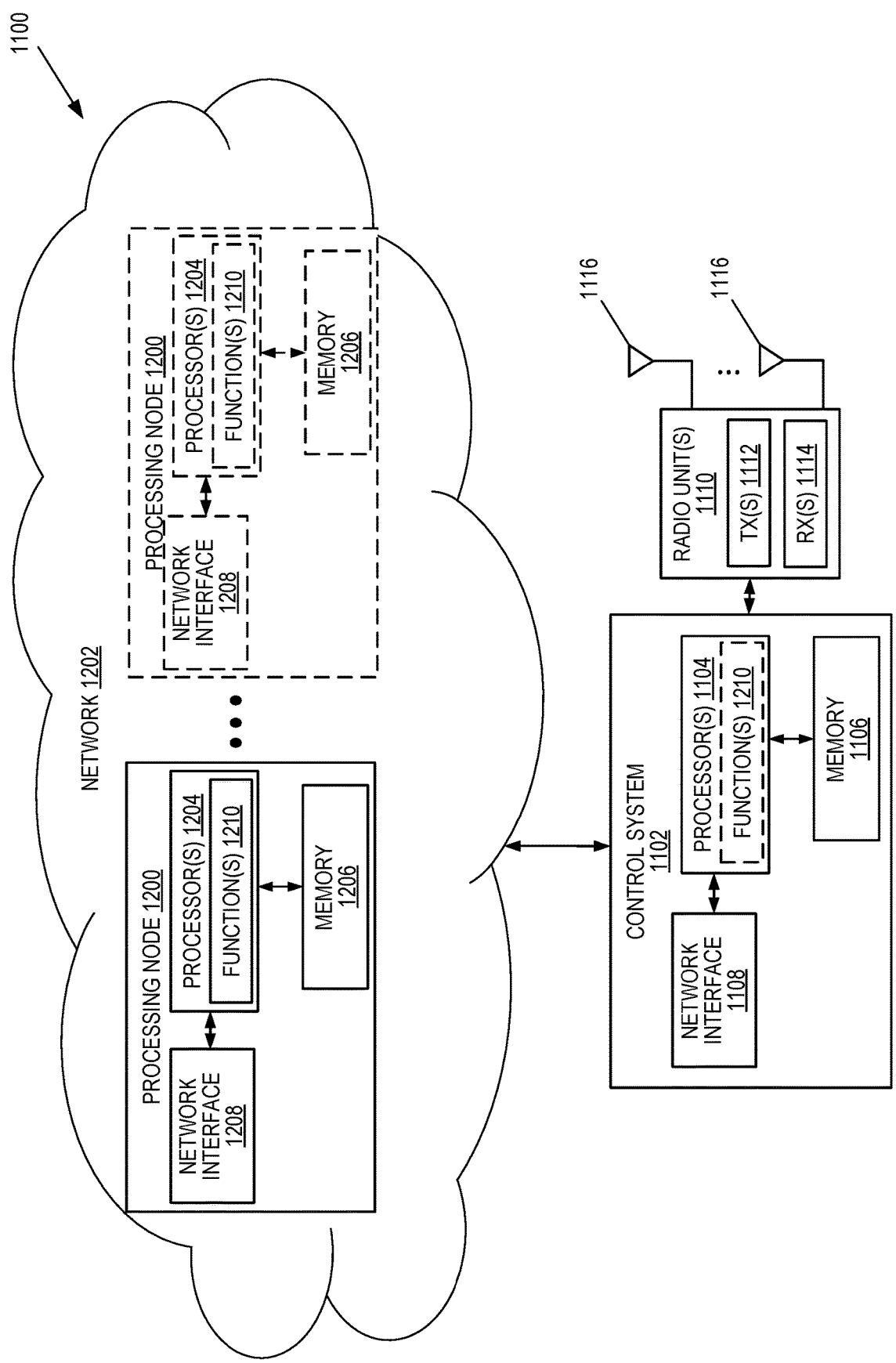
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
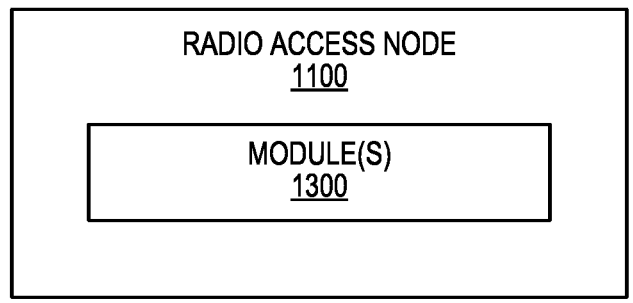
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
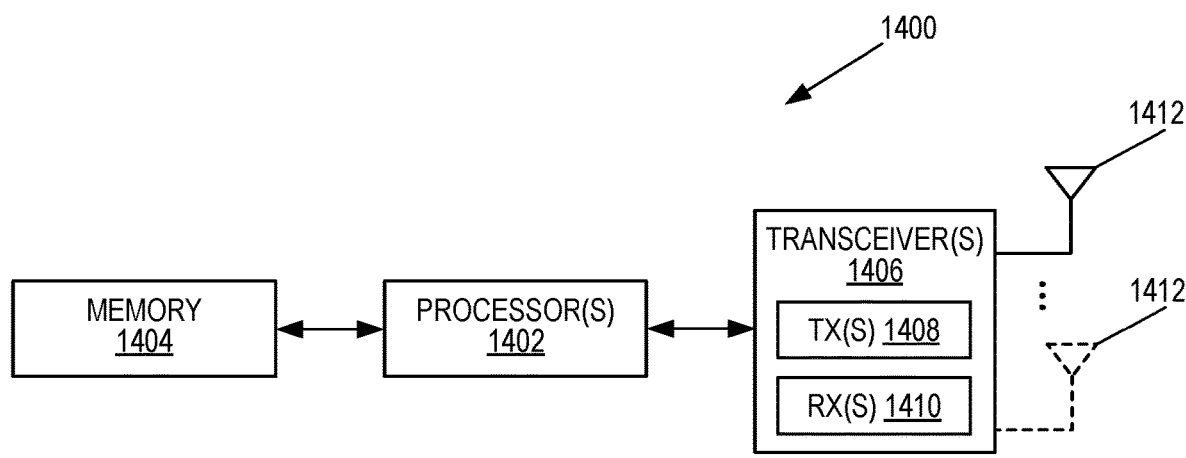
FIG. 14 is a schematic block diagram of a User Equipment (UE) according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
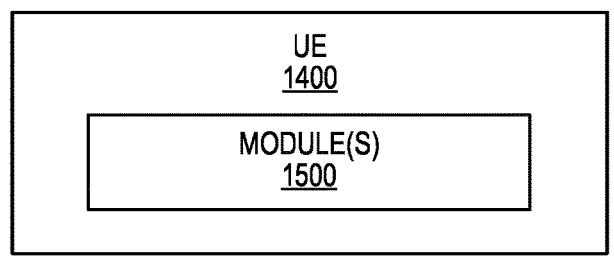
FIG. 15 is a schematic block diagram of the UE according to some other embodiments of the present disclosure.

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
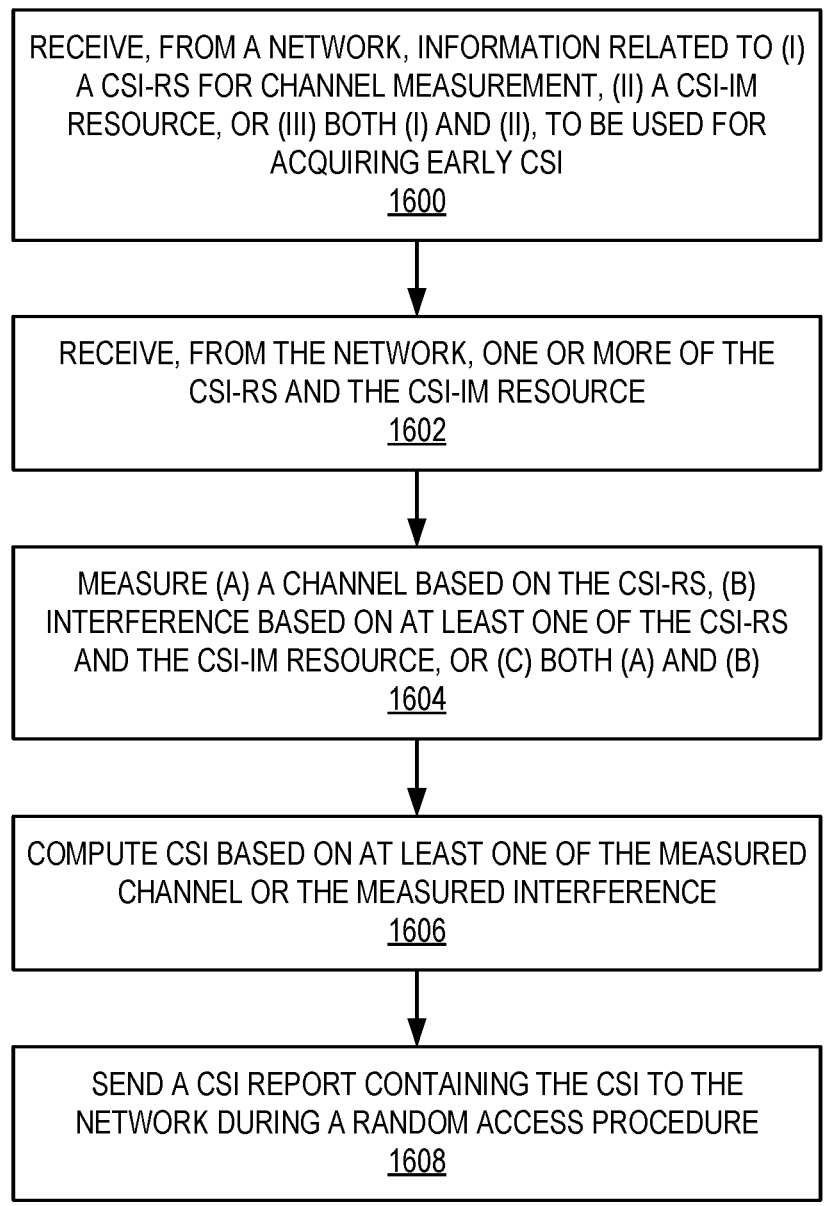
FIG. 16 depicts a method for providing CSI reporting in a random access procedure in accordance with particular embodiments.

FIG. 16 depicts a method for providing CSI reporting in a random access procedure in accordance with particular embodiments. The method may be performed by a UE (e.g., a wireless device). The method begins at step 1600 with receiving, from a network, information related to (I) a CSI-RS for channel measurement, (II) a CSI-IM resource, or (III) both (I) and (II), to be used for acquiring early CSI. The method also includes step 1602 with receiving, from the network, one or more of the CSI-RS and the CSI-IM resource. The method also includes step 1604 with measuring (A) a channel based on the CSI-RS, (B) interference based on at least one of the CSI-RS and the CSI-IM resource, or (C) both (A) and (B). The method also includes step 1606 with computing CSI based on at least one of the measured channel or the measured interference. The method also includes step 1608 with sending a CSI report containing the CSI to the network during a random access procedure.

Figure 17:
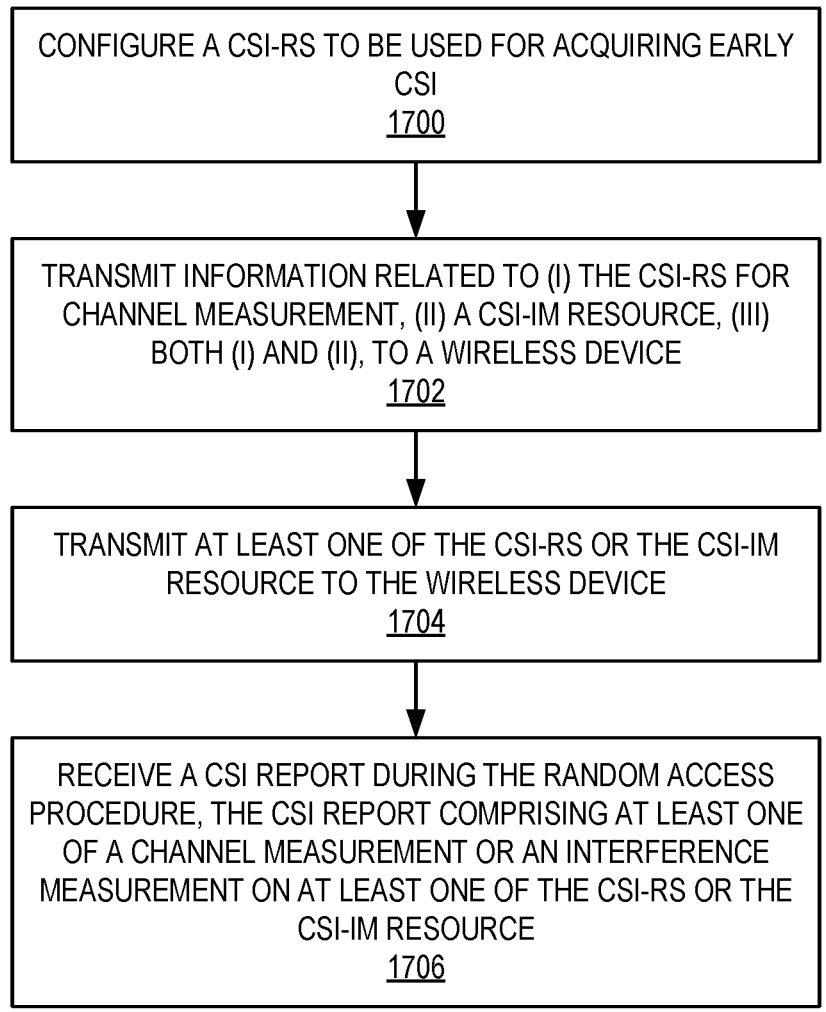
FIG. 17 depicts a method for receiving CSI reporting in a random access procedure in accordance with particular embodiments.

FIG. 17 depicts a method for receiving CSI reporting in a random access procedure in accordance with particular embodiments. This method may be performed by a base station. The method begins at step 1700 with configuring a CSI-RS to be used for acquiring early CSI. The method also includes step 1702 with transmitting information related to (I) the CSI-RS for channel measurement, (II) a CSI-IM resource, or (III) both (I) and (II), to a wireless device. The method also includes step 1704 with transmitting at least one of the CSI-RS or the CSI-IM resource to the wireless device. The method also includes step 1706 with receiving a CSI report during the random access procedure, the CSI report comprising at least one of a channel measurement or an interference measurement on at least one of the CSI-RS or the CSI-IM resource.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for providing early CSI reporting, the method comprising one or more of: receiving, from a network, information related to a CSI-RS to be used for acquiring early CSI; receiving, from the network, the CSI-RS; measuring at least one of a channel or interference on the CSI-RS using the information related to the CSI-RS; and sending a CSI report to the network during the random access procedure.

Embodiment 2: The method of embodiment 1, wherein the information related to the CSI-RS comprises a time and frequency position of the CSI-RS.

Embodiment 3: The method of any one of embodiments 1 to 2, wherein the information related to the CSI-RS comprises a number of CSI-RS ports where the number of CSI-RS ports is more than one.

Embodiment 4: The method of any one of embodiments 1 to 3, wherein the information related to the CSI-RS comprises a scrambling sequence of the CSI-RS.

Embodiment 5: The method of any one of embodiments 2 to 4, wherein remaining information needed to define the CSI-RS is given by specifications.

Embodiment 6: The method of any one of embodiments 1 to 5, wherein the CSI-RS is transmitted in a pre-defined physical resource relative to an earlier received channel.

Embodiment 7: The method of embodiment 6, wherein the earlier received channel is a SSB or a SIB1.

Embodiment 8: The method of any one of embodiments 6 to 7, wherein the CSI-RS is directly measured without receiving a trigger.

Embodiment 9: The method of any one of embodiments 1 to 8, wherein the information related to the CSI-RS comprises an indication of a default CSI reporting setting(s) for a CSI and/or one or more default CSI resource settings containing information of the CSI-RS and/or an associated CSI-IM.

Embodiment 10: The method of embodiment 9, further comprising receiving, from the network, a triggering of the CSI-RS, and/or the CSI-IM and an associated CSI report via Message 2 of a random access procedure.

Embodiment 11: The method of embodiment 10, wherein one or more of the following further apply: the CSI is an aperiodic CSI; the CSI-RS is an aperiodic CSI-RS; the CSI-IM is an aperiodic CSI-IM; and the CSI report is an aperiodic CSI report.

Embodiment 12: The method of embodiment 11, wherein one or more of the following further apply: measuring the at least one of a channel or interference on the CSI-RS comprises measuring at least one of a channel or interference on the aperiodic CSI-RS and/or the aperiodic CSI-IM and using the measurements to compute the aperiodic CSI report; and sending the CSI report to the network during the random access procedure comprises sending the aperiodic CSI report on Message 3 of the random access procedure to the network.

Embodiment 13: A method performed by a wireless device for performing CSI reporting during a random access procedure, the method comprising one or more of: receiving an indication, from a network, of a default CSI reporting setting(s) for an aperiodic CSI and/or one or more default CSI resource settings containing information of an associated aperiodic CSI-RS and/or an associated aperiodic CSI-IM; receiving, from the network, a triggering of the aperiodic CSI-RS, and/or the aperiodic CSI-IM and an associated aperiodic CSI report via Message 2 of the random access procedure; measuring a channel and/or interference on the aperiodic CSI-RS and/or aperiodic CSI-IM and using the measurements to compute the aperiodic CSI report; and sending the aperiodic CSI report on Message 3 of the random access procedure to the network.

Embodiment 14: The method of any one of embodiments 12 to 13, wherein receiving the indication of the default CSI reporting setting(s) and/or the one or more default CSI resource settings is done via a SIB1.

Embodiment 15: The method of any one of embodiments 12 to 14, wherein the number of ports associated with the aperiodic CSI-RS is more than 1.

Embodiment 16: The method of any one of embodiments 12 to 15, wherein a subset of bits in a DCI scrambled by a RA-RNTI is used to select a particular default CSI reporting setting when more than one default CSI reporting setting is indicated.

Embodiment 17: The method of any one of embodiments 12 to 15, wherein a subset of bits in a DCI scrambled by a RA-RNTI is used to select a particular default CSI resource setting for channel measurement when more than one default CSI resource setting for channel measurement is indicated.

Embodiment 18: The method of any one of embodiments 12 to 15, wherein a subset of bits in a DCI scrambled by a RA-RNTI is used to select a particular default CSI resource setting for interference measurement when more than one default CSI resource setting for interference measurement are indicated.

Embodiment 19: The method of any one of embodiments 12 to 18, wherein each default CSI reporting setting and/or the related CSI resource setting for channel measurement corresponds to CSI feedback for a different number of antenna ports.

Embodiment 20: The method of any one of embodiments 12 to 19, wherein the aperiodic CSI report on Message 3 is restricted to report only wideband CQI and wideband PMI.

Embodiment 21: The method of any one of embodiments 12 to 19, wherein the aperiodic CSI report on Message 3 is restricted to report only wideband CQI and/or wideband PMI when the number of antenna ports is less than or equal to eight.

Embodiment 22: The method of any one of embodiments 12 to 19, wherein the aperiodic CSI report on Message 3 is restricted to report only subband CQI and/or subband PMI when the number of antenna ports is less than or equal to four.

Embodiment 23: The method of any one of embodiments 12 to 22, wherein a Type-D QCL source for the aperiodic CSI-RS and the aperiodic CSI-IM triggered by Message 2 is a SSB that was acquired during initial access.

Embodiment 24: The method of any one of embodiments 12 to 22, wherein Message 2 additionally triggers an aperiodic TRS.

Embodiment 25: The method of embodiment 24, wherein the aperiodic TRS serves as a Type-A QCL source to the aperiodic CSI-RS.

Embodiment 26: The method of embodiment 24, wherein the aperiodic TRS serves as Type-D QCL source to the aperiodic CSI-RS and the aperiodic CSI-IM.

Embodiment 27: The method of any one of embodiments 12 to 26, wherein a 'PUSCH time resource allocation' field in a RAR grant in Message 2 is used to jointly indicate timing offsets for an aperiodic NZP CSI-RS/aperiodic CSI-IM and Message 3.

Embodiment 28: The method of any one of embodiments 12 to 26, wherein a subset of bits in a DCI scrambled by a RA-RNTI is used to indicate a timing offset of one or more of the aperiodic CSI-RS and the aperiodic CSI-IM.

Embodiment 29: The method of any one of embodiments 12 to 26, wherein a 'PUSCH time resource allocation' field in a RAR grant in Message 2 is used to jointly indicate timing offsets for aperiodic TRS, aperiodic NZP CSI-RS/aperiodic CSI-IM, and Message 3.

Embodiment 30: The method of any one of embodiments 12 to 26, wherein a subset of bits in a DCI scrambled by a RA-RNTI is used to indicate a timing offset of one or more of an aperiodic TRS, the aperiodic CSI-RS, and the aperiodic CSI-IM.

Embodiment 31: The method of any of the previous embodiments, further comprising: providing user data; and forwarding the user data to a host computer via the transmission to the base station.

Group B Embodiments

Embodiment 32: A method performed by a base station for receiving CSI reporting in a random access procedure, the method comprising one or more of: configuring a CSI-RS to be used for acquiring early CSI; transmitting information related to the CSI-RS to a wireless device; transmitting the CSI-RS to the wireless device; receiving a CSI report during the random access procedure, the CSI report comprising at least one of a channel measurement or an interference measurement on the CSI-RS.

Embodiment 33: The method of embodiment 32, wherein the information related to the CSI-RS comprises a time and frequency position of the CSI-RS.

Embodiment 34: The method of any one of embodiments 32 to 33, wherein the information related to the CSI-RS comprises a number of CSI-RS ports where the number of CSI-RS ports is more than one.

Embodiment 35: The method of any one of embodiments 32 to 34, wherein the information related to the CSI-RS comprises a scrambling sequence of the CSI-RS.

Embodiment 36: The method of any one of embodiments 33 to 35, wherein remaining information needed to define the CSI-RS is given by specifications.

Embodiment 37: The method of any one of embodiments 32 to 36, wherein the CSI-RS is transmitted in a pre-defined physical resource relative to an earlier received channel.

Embodiment 38: The method of embodiment 37, wherein the earlier received channel is a SSB or a SIB1.

Embodiment 39: The method of any one of embodiments 32 to 38, wherein the information related to the CSI-RS comprises an indication of a default CSI reporting setting(s)

for a CSI and/or one or more default CSI resource settings containing information of the CSI-RS and/or an associated CSI-IM.

Embodiment 40: The method of embodiment 39, further comprising transmitting, to the wireless device, a triggering of the CSI-RS, and/or the CSI-IM and an associated CSI report via Message 2 of a random access procedure.

Embodiment 41: The method of embodiment 40, wherein one or more of the following further apply: the CSI is an aperiodic CSI; the CSI-RS is an aperiodic CSI-RS; the CSI-IM is an aperiodic CSI-IM; and the CSI report is an aperiodic CSI report.

Embodiment 42: The method of embodiment 41, wherein receiving the CSI report during the random access procedure comprises receiving the aperiodic CSI report on Message 3 of the random access procedure from the wireless device.

Embodiment 43: The method of embodiment 42, wherein transmitting the indication of a default CSI reporting setting(s) and one or more default CSI resource settings is done via a SIB1.

Embodiment 44: The method of any one of embodiments 42 to 43, wherein the number of ports associated with the aperiodic CSI-RS is more than 1.

Embodiment 45: The method of any one of embodiments 42 to 44, wherein a subset of bits in a DCI scrambled by a RA-RNTI is used to select a particular default CSI reporting setting when more than one default CSI reporting setting is indicated.

Embodiment 46: The method of any one of embodiments 42 to 44, wherein a subset of bits in a DCI scrambled by a RA-RNTI is used to select a particular default CSI resource setting for channel measurement when more than one default CSI resource setting for channel measurement is indicated.

Embodiment 47: The method of any one of embodiments 42 to 44, wherein a subset of bits in a DCI scrambled by a RA-RNTI is used to select a particular default CSI resource setting for interference measurement when more than one default CSI resource setting for interference measurement are indicated.

Embodiment 48: The method of any one of embodiments 42 to 47, wherein each default CSI reporting setting and the related CSI resource setting for channel measurement corresponds to CSI feedback for a different number of antenna ports.

Embodiment 49: The method of any one of embodiments 42 to 48, wherein the aperiodic CSI report on Message 3 is restricted to report only wideband CQI and wideband PMI.

Embodiment 50: The method of any one of embodiments 42 to 48, wherein the aperiodic CSI report on Message 3 is restricted to report only wideband CQI and/or wideband PMI when the number of antenna ports is less than or equal to eight.

Embodiment 51: The method of any one of embodiments 42 to 48, wherein the aperiodic CSI report on Message 3 is restricted to report only subband CQI and/or subband PMI when the number of antenna ports is less than or equal to four.

Embodiment 52: The method of any one of embodiments 42 to 51, wherein a Type-D QCL source for the aperiodic CSI-RS and the aperiodic CSI-IM triggered by Message 2 is a SSB that was transmitted during initial access.

Embodiment 53: The method of any one of embodiments 42 to 51, wherein Message 2 additionally triggers an aperiodic TRS.

Embodiment 54: The method of any one of embodiments 49 to 51, wherein the aperiodic TRS serves as a Type-A QCL source to the aperiodic CSI-RS.

Embodiment 55: The method of any one of embodiments 49 to 51, wherein the aperiodic TRS serves as Type-D QCL source to the aperiodic CSI-RS and the aperiodic CSI-IM.

Embodiment 56: The method of any one of embodiments 42 to 55, wherein a 'PUSCH time resource allocation' field in a RAR grant in Message 2 is used to jointly indicate timing offsets for an aperiodic NZP CSI-RS/aperiodic CSI-IM and Message 3.

Embodiment 57: The method of any one of embodiments 42 to 55, wherein a subset of bits in a DCI scrambled by a RA-RNTI is used to indicate a timing offset of one or more of the aperiodic CSI-RS and the aperiodic CSI-IM.

Embodiment 58: The method of any one of embodiments 42 to 55, wherein a 'PUSCH time resource allocation' field in a RAR grant in Message 2 is used to jointly indicate timing offsets for one or more of aperiodic TRS, aperiodic NZP CSI-RS/aperiodic CSI-IM, and Message 3.

Embodiment 59: The method of any one of embodiments 42 to 55, wherein a subset of bits in a DCI scrambled by a RA-RNTI is used to indicate a timing offset of one or more of an aperiodic TRS, the aperiodic CSI-RS, and the aperiodic CSI-IM.

Embodiment 60: The method of any of the previous embodiments, further comprising: obtaining user data; and forwarding the user data to a host computer or a wireless device.

Group C Embodiments

Embodiment 61: A wireless device for providing CSI reporting in a random access procedure, the wireless device comprising: processing circuitry configured to perform any of the steps of any of the Group A embodiments; and power supply circuitry configured to supply power to the wireless device.

Embodiment 62: A base station for receiving CSI reporting in a random access procedure, the base station comprising: processing circuitry configured to perform any of the steps of any of the Group B embodiments; and power supply circuitry configured to supply power to the base station.

Embodiment 63: A UE for providing CSI reporting in a random access procedure, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 64: A communication system including a host computer comprising: processing circuitry configured to provide user data; and a communication interface configured to forward the user data to a cellular network for transmission to a UE; wherein the cellular network comprises a base station having a radio interface and processing circuitry, the base station's processing circuitry configured to perform any of the steps of any of the Group B embodiments.

Embodiment 65: The communication system of the previous embodiment further including the base station.

Embodiment 66: The communication system of the previous 2 embodiments, further including the UE, wherein the UE is configured to communicate with the base station.

Embodiment 67: The communication system of the previous 3 embodiments, wherein: the processing circuitry of the host computer is configured to execute a host application, thereby providing the user data; and the UE comprises processing circuitry configured to execute a client application associated with the host application.

Embodiment 68: A method implemented in a communication system including a host computer, a base station, and a UE, the method comprising: at the host computer, providing user data; and at the host computer, initiating a transmission carrying the user data to the UE via a cellular network comprising the base station, wherein the base station performs any of the steps of any of the Group B embodiments.

Embodiment 69: The method of the previous embodiment, further comprising, at the base station, transmitting the user data.

Embodiment 70: The method of the previous 2 embodiments, wherein the user data is provided at the host computer by executing a host application, the method further comprising, at the UE, executing a client application associated with the host application.

Embodiment 71: A UE configured to communicate with a base station, the UE comprising a radio interface and processing circuitry configured to perform the method of the previous 3 embodiments.

Embodiment 72: A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

Embodiment 73: The communication system of the previous embodiment, wherein the cellular network further includes a base station configured to communicate with the UE.

Embodiment 74: The communication system of the previous 2 embodiments, wherein: the processing circuitry of the host computer is configured to execute a host application, thereby providing the user data; and the UE's processing circuitry is configured to execute a client application associated with the host application.

Embodiment 75: A method implemented in a communication system including a host computer, a base station, and a UE, the method comprising: at the host computer, providing user data; and at the host computer, initiating a transmission carrying the user data to the UE via a cellular network comprising the base station, wherein the UE performs any of the steps of any of the Group A embodiments.

Embodiment 76: The method of the previous embodiment, further comprising at the UE, receiving the user data from the base station.

Embodiment 77: A communication system including a host computer comprising: communication interface configured to receive user data originating from a transmission from a UE to a base station; wherein the UE comprises a radio interface and processing circuitry, the UE's processing circuitry configured to perform any of the steps of any of the Group A embodiments.

Embodiment 78: The communication system of the previous embodiment, further including the UE.

Embodiment 79: The communication system of the previous 2 embodiments, further including the base station, wherein the base station comprises a radio interface configured to communicate with the UE and a communication interface configured to forward to the host computer the user data carried by a transmission from the UE to the base station.

Embodiment 80: The communication system of the previous 3 embodiments, wherein: the processing circuitry of the host computer is configured to execute a host application; and the UE's processing circuitry is configured to execute a client application associated with the host application, thereby providing the user data.

Embodiment 81: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 82: A method implemented in a communication system including a host computer, a base station, and a UE, the method comprising: at the host computer, receiving user data transmitted to the base station from the UE, wherein the UE performs any of the steps of any of the Group A embodiments.

Embodiment 83: The method of the previous embodiment, further comprising, at the UE, providing the user data to the base station.

Embodiment 84: The method of the previous 2 embodiments, further comprising: at the UE, executing a client application, thereby providing the user data to be transmitted; and at the host computer, executing a host application associated with the client application.

Embodiment 85: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 86: A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

Embodiment 87: The communication system of the previous embodiment further including the base station.

Embodiment 88: The communication system of the previous 2 embodiments, further including the UE, wherein the UE is configured to communicate with the base station.

Embodiment 89: The communication system of the previous 3 embodiments, wherein: the processing circuitry of the host computer is configured to execute a host application; and the UE is configured to execute a client application associated with the host application, thereby providing the user data to be received by the host computer.

Embodiment 90: A method implemented in a communication system including a host computer, a base station, and a UE, the method comprising: at the host computer, receiving, from the base station, user data originating from a transmission which the base station has received from the UE, wherein the UE performs any of the steps of any of the Group A embodiments.

Embodiment 91: The method of the previous embodiment, further comprising at the base station, receiving the user data from the UE.

Embodiment 92: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core
- 5GS Fifth Generation System
- 16 QAM 16-bit Quadrature Amplitude Modulation
- AMF Access and Mobility Function
- ASIC Application Specific Integrated Circuit
- AUSF Authentication Server Function
- CE Coverage Enhancement
- CPU Central Processing Unit
- CP Cyclic Prefix
- CP-OFDM Cyclic Prefix Orthogonal Frequency Division Multiplexing
- CQI Channel Quality Indicator
- CRC Cyclic Redundancy Checksum
- CRI Channel State Information Reference Signal Resource Indicator
- CSI Channel State Information
- CSI-IM Channel State Information Interference Measurement
- CSI-RS Channel State Information Reference Signal
- DCI Downlink Control Information
- DFT Discrete Fourier Transform
- DFT-S-OFDM Discrete Fourier Transform Spread Orthogonal Frequency Division Multiplexing
- DMRS Demodulation Reference Signal
- DSP Digital Signal Processor
- eNB Enhanced or Evolved Node B
- EPS Evolved Packet System
- E-UTRA Evolved Universal Terrestrial Radio Access
- FPGA Field Programmable Gate Array
- gNB New Radio Base Station
- HSS Home Subscriber Server
- LI Layer Indicator
- LTE Long Term Evolution
- MAC Medium Access Control
- MCS Modulation Coding Scheme
- MIB Master Information Block
- MIMO Multiple Input Multiple Output
- MME Mobility Management Entity
- MTC Machine Type Communication
- NEF Network Exposure Function
- NF Network Function
- NR New Radio
- NR-PBCH New Radio Physical Broadcast Channel
- NR-PSS New Radio Primary Synchronization Signal
- NRF Network Function Repository Function
- NR-SSS New Radio Secondary Synchronization Signal
- NSSF Network Slice Selection Function
- NZP Non-Zero Power
- OFDM Orthogonal Frequency Division Multiplexing
- OFDMA Orthogonal Frequency Division Multiple Access
- PBCH Physical Broadcast Channel
- PCF Policy Control Function
- PCI Physical Cell Identity
- PDCCH Physical Downlink Control Channel
- PDCH Physical Data Channel
- PDSCH Physical Downlink Shared Channel
- PDU Protocol Data Unit
- P-GW Packet Data Network Gateway
- PMI Precoder Matrix Indicator
- PUSCH Physical Uplink Shared Channel
- QCL Quasi Co-Located
- QPSK Quadrature Phase Shift Keying
- RAM Random Access Memory
- RAN Radio Access Network
- RAR Random Access Response
- RA-RNTI Random Access Radio Network Temporary Identifier
- RB Resource Block
- RE Resource Element
- RI Rank Indicator
- RMSI Remaining Minimum System Information
- ROM Read Only Memory
- RRC Radio Resource Control
- RRH Remote Radio Head
- RS Reference Signal
- SCEF Service Capability Exposure Function
- SIB System Information Block
- SIB1 First System Information Block
- SINR Signal-to-Interference-Plus-Noise Ratio
- SMF Session Management Function
- SP Semi-Persistent
- SS Synchronization Signal
- SSB Synchronization Signal Block
- TA Timing Advance
- TB Transport Block
- TPC Transmission Power Control
- TRS Tracking Reference Signal
- UDM Unified Data Management
- UE User Equipment
- UPF User Plane Function
- ZP Zero Power Those skilled in the art will recognize improvements and modifications to the embodiments of the present disclosure. All such improvements and modifications are considered within the scope of the concepts disclosed herein.

What is claimed is:

1. A method performed by a wireless device for providing early Channel State Information, CSI, reporting, the method comprising:
   receiving, from a network, information related to (I) a CSI Reference Signal, CSI-RS, for channel measurement, (II) a CSI Interference Measurement, CSI-IM, resource, or (III) both (I) and (II), to be used for acquiring early CSI;
   receiving, from the network, one or more of the CSI-RS and the CSI-IM resource;
   measuring (A) a channel based on the CSI-RS, (B) interference based on at least one of the CSI-RS and the CSI-IM resource, or (C) both (A) and (B);
   computing CSI based on at least one of the measured channel or the measured interference; and
   sending a CSI report containing the CSI to the network during a random access procedure;

wherein the information related to (I) the CSI-RS for channel measurement, (II) the CSI-IM resource, or (III) both (I) and (II) comprises one or more of the group consisting of:
a time and frequency position of the CSI-RS;
a number of CSI-RS ports where the number of CSI-RS ports is more than one;
a scrambling sequence of the CSI-RS;
an indication of: (a) one or more default CSI reporting settings for a CSI, (b) one or more default CSI resource settings containing information of the CSI-RS, or (c) both (a) and (b); and
is carried in a System Information Block, SIB.

2. The method of claim 1, wherein the CSI-RS is configured as a Tracking Reference Signal, TRS.

3. The method of claim 2, wherein remaining information needed to define the CSI-RS is given by specifications.

4. The method of claim 1, wherein the CSI-RS is transmitted in a pre-defined physical resource relative to an earlier received channel.

5. The method of claim 4, wherein the earlier received channel is a Synchronization Signal Block, SSB, or a first System Information Block, SIB1.

6. The method of claim 4, wherein the CSI-RS can be measured before receiving a trigger.

7. The method of claim 1, further comprising receiving, from the network via Message 2 of the random access procedure, a triggering of receiving at least one of the CSI-RS or the CSI-IM, and transmitting an associated CSI report.

8. The method of claim 7, wherein one or more of the following apply:
the CSI is an aperiodic CSI;
the CSI-RS is an aperiodic CSI-RS;
the CSI-IM resource is an aperiodic CSI-IM; and
the CSI report is an aperiodic CSI report.

9. The method of claim 8, wherein one or more of the following apply:
measuring the channel and interference comprises measuring the channel based on the aperiodic CSI-RS and the interference based on the aperiodic CSI-RS or the aperiodic CSI-IM, and using the measurements to compute the CSI for the aperiodic CSI report; and
sending the CSI report containing the CSI to the network during the random access procedure comprises sending the aperiodic CSI report on Message 3 of the random access procedure to the network.

10. The method of claim 1, wherein:
receiving, from the network, information related to (I) the CSI-RS for channel measurement, (II) the CSI-IM resource, or (III) both (I) and (II), to be used for acquiring early CSI comprises receiving an indication, from the network, of:
(a) one or more default CSI reporting settings for an aperiodic CSI,
(b) one or more default CSI resource settings containing information of:
(i) an associated aperiodic CSI-RS,
(ii) an associated aperiodic CSI-IM, or
(iii) both an associated aperiodic CSI-RS and an associated CSI-IM, or
(c) a combination of (a) and (b);
receiving, from the network, the CSI-RS comprises receiving, from the network via Message 2 of the random access procedure, a triggering of receiving at least one of the aperiodic CSI-RS or the aperiodic CSI-IM, and transmitting an associated aperiodic CSI report;
measuring (A) the channel based on the CSI-RS, (B) the interference based on at least one of the CSI-RS and the CSI-IM resource, or (C) both (A) and (B) comprises measuring at least one of the channel or interference on the aperiodic CSI-RS or aperiodic CSI-IM and using the measurements to compute the CSI for the aperiodic CSI report; and
sending the aperiodic CSI report containing the CSI to the network during the random access procedure comprises sending the aperiodic CSI report on Message 3 of the random access procedure to the network.

11. The method of claim 10, wherein receiving the indication of one or more default CSI reporting settings or one or more default CSI resource settings is done via a System Information Block, SIB.

12. The method of claim 11, wherein the SIB is a first SIB, SIB1.

13. The method of claim 10, wherein the number of ports associated with the aperiodic CSI-RS is one or more.

14. The method of claim 10, wherein a subset of bits in a Downlink Control Information, DCI, scrambled by a Random Access Radio Network Temporary Identifier, RA-RNTI, is used to select a particular default CSI reporting setting when more than one default CSI reporting setting is indicated.

15. The method of claim 10, wherein a subset of bits in a Downlink Control Information, DCI, scrambled by a Random Access Radio Network Temporary Identifier, RA-RNTI, is used to select a particular default CSI resource setting for channel measurement when more than one default CSI resource setting for channel measurement is indicated.

16. The method of claim 10, wherein a subset of bits in a Downlink Control Information, DCI, scrambled by a Random Access Radio Network Temporary Identifier, RA-RNTI, is used to select a particular default CSI resource setting for interference measurement when more than one default CSI resource setting for interference measurement are indicated.

17. The method of claim 10, wherein each default CSI reporting setting or related CSI resource setting for channel measurement corresponds to CSI feedback for a different number of antenna ports.

18. The method of claim 10, wherein the aperiodic CSI report on Message 3 is restricted to report only wideband Channel Quality Indicator, CQI, and wideband Precoder Matrix Indicator, PMI.

19. The method of claim 10, wherein the aperiodic CSI report on Message 3 is restricted to report only at least one of wideband Channel Quality Indicator, CQI, or wideband Precoder Matrix Indicator, PMI, when the number of antenna ports is less than or equal to eight.

20. The method of claim 10, wherein the aperiodic CSI report on Message 3 is restricted to report only: (a) subband Channel Quality Indicator, CQI, (b) subband Precoder Matrix Indicator, PMI, or (c) both (a) and (b), when the number of antenna ports is less than or equal to four.

21. The method of claim 10, wherein a Type-D Quasi Co-Located, QCL, source for the aperiodic CSI-RS and the aperiodic CSI-IM triggered by Message 2 is a Synchronization Signal Block, SSB, that was acquired during initial access.

22. The method of claim 10, wherein Message 2 additionally triggers an aperiodic Tracking Reference Signal, TRS.

23. The method of claim 22, wherein the aperiodic TRS serves as a Type-A Quasi Co-Located, QCL, source to the aperiodic CSI-RS.

24. The method of claim 22, wherein the aperiodic TRS serves as a Type-D Quasi Co-Located, QCL, source to the aperiodic CSI-RS and the aperiodic CSI-IM.

25. The method of claim 10, wherein a 'Physical Uplink Shared Channel, PUSCH, time resource allocation' field in a Random Access Response, RAR, grant in Message 2 is used to jointly indicate timing offsets for an aperiodic Non-Zero Power, NZP, CSI-RS/aperiodic CSI-IM and Message 3.

26. The method of claim 10, wherein a subset of bits in a Downlink Control Information, DCI, scrambled by a Random Access Radio Network Temporary Identifier, RA-RNTI, is used to indicate a timing offset of one or more of the aperiodic CSI-RS and the aperiodic CSI-IM.

27. The method of claim 10, wherein a 'Physical Uplink Shared Channel, PUSCH, time resource allocation' field in a Random Access Response, RAR, grant in Message 2 is used to jointly indicate timing offsets for aperiodic Tracking Reference Signal, TRS, aperiodic Non-Zero Power, NZP, CSI-RS/aperiodic CSI-IM, and Message 3.

28. The method of claim 10, wherein a subset of bits in a Downlink Control Information, DCI, scrambled by a Random Access Radio Network Temporary Identifier, RA-RNTI, is used to indicate a timing offset of one or more of an aperiodic Tracking Reference Signal, TRS, the aperiodic CSI-RS, and the aperiodic CSI-IM.

29. A wireless device for providing Channel State Information, CSI, reporting in a random access procedure, the wireless device comprising:
processing circuitry configured to cause the wireless device to:
receive, from a network, information related to (I) a CSI Reference Signal, CSI-RS, for channel measurement, (II) a CSI Interference Measurement, CSI-IM, resource, or (III) both (I) and (II), to be used for acquiring early CSI;
receive, from the network, one or more of the CSI-RS and the CSI-IM resource;
measure (A) a channel based on the CSI-RS, (B) interference based on at least one of the CSI-RS and the CSI-IM resource, or (C) both (A) and (B);
compute CSI based on at least one of the measured channel or the measured interference; and
send a CSI report containing the CSI to the network during a random access procedure; and
power supply circuitry configured to supply power to the wireless device;
wherein the information related to (I) the CSI-RS for channel measurement, (II) the CSI-IM resource, or (III) both (I) and (II) comprises one or more of the group consisting of:
a time and frequency position of the CSI-RS;
a number of CSI-RS ports where the number of CSI-RS ports is more than one;
a scrambling sequence of the CSI-RS;
an indication of: (a) one or more default CSI reporting settings for a CSI, (b) one or more default CSI resource settings containing information of the CSI-RS, or (c) both (a) and (b); and
is carried in a System Information Block, SIB.

30. A method performed by a base station for receiving Channel State Information, CSI, reporting in a random access procedure, the method comprising:
configuring a CSI Reference Signal, CSI-RS, to be used for acquiring early CSI;
transmitting information related to (I) the CSI-RS for channel measurement, (II) a CSI Interference Measurement, CSI-IM, resource, or (III) both (I) and (II), to a wireless device;
transmitting at least one of the CSI-RS or the CSI-IM resource to the wireless device; and
receiving a CSI report during the random access procedure, the CSI report comprising at least one of a channel measurement or an interference measurement on at least one of the CSI-RS or the CSI-IM resource;
wherein the information related to (I) the CSI-RS for channel measurement, (II) the CSI-IM resource, or (III) both (I) and (II) comprises one or more of the group consisting of:
a time and frequency position of the CSI-RS;
a number of CSI-RS ports where the number of CSI-RS ports is more than one;
a scrambling sequence of the CSI-RS;
an indication of: (a) one or more default CSI reporting settings for a CSI, (b) one or more default CSI resource settings containing information of the CSI-RS, or (c) both (a) and (b); and
is carried in a System Information Block, SIB.

31. A base station for receiving Channel State Information, CSI, reporting in a random access procedure, the base station comprising:
processing circuitry configured to cause the base station to:
configure a CSI Reference Signal, CSI-RS, to be used for acquiring early CSI;
transmit information related to (I) the CSI-RS for channel measurement, (II) a CSI Interference Measurement, CSI-IM, resource, or (III) both (I) and (II), to a wireless device;
transmit at least one of the CSI-RS or the CSI-IM resource to the wireless device; and
receive a CSI report during the random access procedure, the CSI report comprising at least one of a channel measurement or an interference measurement on at least one of the CSI-RS or the CSI-IM resource; and
power supply circuitry configured to supply power to the base station;
wherein the information related to (I) the CSI-RS for channel measurement, (II) the CSI-IM resource, or (III) both (I) and (II) comprises one or more of the group consisting of:
a time and frequency position of the CSI-RS;
a number of CSI-RS ports where the number of CSI-RS ports is more than one;
a scrambling sequence of the CSI-RS;
an indication of: (a) one or more default CSI reporting settings for a CSI, (b) one or more default CSI resource settings containing information of the CSI-RS, or (c) both (a) and (b); and
is carried in a System Information Block, SIB.

* * * * *